United States Patent
Stolfo et al.

(10) Patent No.: US 10,178,104 B2
(45) Date of Patent: Jan. 8, 2019

(54) METHODS, MEDIA, AND SYSTEMS FOR SECURING COMMUNICATIONS BETWEEN A FIRST NODE AND A SECOND NODE

(71) Applicant: The Trustees of Columbia University in the City of New York, New York, NY (US)

(72) Inventors: Salvatore J. Stolfo, New York, NY (US); Gabriela F. Ciocarlie, New York, NY (US); Vanessa Frias-Martinez, New York, NY (US); Janak Parekh, Manhasset, NY (US); Angelos D. Keromytis, New York, NY (US); Joseph Sherrick, Jackson, NJ (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 15/587,763

(22) Filed: May 5, 2017

(65) Prior Publication Data
US 2018/0077165 A1    Mar. 15, 2018

Related U.S. Application Data

(63) Continuation of application No. 15/221,384, filed on Jul. 27, 2016, now Pat. No. 9,654,478, which is a
(Continued)

(51) Int. Cl.
*H04L 29/06* (2006.01)

(52) U.S. Cl.
CPC .......... *H04L 63/102* (2013.01); *H04L 63/145* (2013.01)

(58) Field of Classification Search
None
See application file for complete search history.

(56) References Cited

U.S. PATENT DOCUMENTS

| 5,440,723 A * | 8/1995 | Arnold | G06F 21/564 |
| | | | 714/2 |
| 5,896,373 A | 4/1999 | Mitts et al. | |

(Continued)

FOREIGN PATENT DOCUMENTS

WO    WO2008118976    10/2008

OTHER PUBLICATIONS

Bauer, Dennis C. et al. Detecting Anomalous Behavior: Optimization Of Network Traffic Parameters Via An Evolution Strategy. Proceedings, IEEE SoutheastCon 2001. https://ieeexplore.ieee.org/stamp/stamp.jsp?tp=&arnumber=923083 (Year: 2001).*

(Continued)

*Primary Examiner* — Jeremiah L Avery
(74) *Attorney, Agent, or Firm* — Byrne Poh LLP

(57) ABSTRACT

Methods, media, and systems for securing communications between a first node and a second node are provided. In some embodiments, methods for securing communication between a first node and a second node are provided. The methods comprising: receiving at least one model of behavior of the second node at the first node; and authorizing the first node to receive traffic from the second node based on the difference between the at least one model of behavior of the second node and at least one model of behavior of the first node.

18 Claims, 7 Drawing Sheets

Related U.S. Application Data continuation of application No. 12/092,224, filed as application No. PCT/US2006/042713 on Oct. 31, 2006, now Pat. No. 9,419,981.

(60) Provisional application No. 60/803,313, filed on May 24, 2006, provisional application No. 60/732,019, filed on Oct. 31, 2005.

(56) References Cited

U.S. PATENT DOCUMENTS

| | | | |
|---|---|---|---|
| 5,991,714 A | 11/1999 | Shaner | |
| 6,101,541 A | 8/2000 | Ellesson et al. | |
| 6,321,338 B1* | 11/2001 | Porras | H04L 41/142 709/224 |
| 6,356,941 B1 | 3/2002 | Cohen | |
| 6,473,413 B1 | 10/2002 | Chiou et al. | |
| 6,681,108 B1 | 1/2004 | Terry et al. | |
| 6,690,918 B2 | 2/2004 | Evans et al. | |
| 6,718,535 B1 | 4/2004 | Underwood | |
| 6,944,656 B2 | 9/2005 | Evrard et al. | |
| 6,965,674 B2 | 11/2005 | Whelan et al. | |
| 7,072,652 B2 | 7/2006 | Stephens | |
| 7,082,114 B1 | 7/2006 | Engwer et al. | |
| 7,100,199 B2 | 8/2006 | Ginter et al. | |
| 7,133,526 B2 | 11/2006 | Whelan et al. | |
| 7,171,215 B2 | 1/2007 | Khouaja et al. | |
| 7,219,239 B1 | 5/2007 | Njemanze et al. | |
| 7,246,156 B2 | 7/2007 | Ginter et al. | |
| 7,328,349 B2 | 2/2008 | Milliken et al. | |
| 7,373,508 B1 | 5/2008 | Meier et al. | |
| 7,376,128 B2 | 5/2008 | Chen et al. | |
| 7,376,969 B1* | 5/2008 | Njemanze | G06F 21/55 709/224 |
| 7,444,679 B2* | 10/2008 | Tarquini | H04L 63/0218 726/23 |
| 7,464,407 B2 | 12/2008 | Nakae et al. | |
| 7,502,615 B2 | 3/2009 | Wilhoite et al. | |
| 7,519,998 B2* | 4/2009 | Cai | G06F 21/562 713/187 |
| 7,543,125 B2 | 6/2009 | Gokhale | |
| 7,596,807 B2* | 9/2009 | Ptacek | H04L 63/029 726/11 |
| 7,607,170 B2* | 10/2009 | Chesla | H04L 63/1408 709/224 |
| 7,620,723 B2 | 11/2009 | Chen et al. | |
| 7,639,714 B2 | 12/2009 | Stolfo et al. | |
| 7,643,464 B2 | 1/2010 | Garg | |
| 7,681,235 B2* | 3/2010 | Chesla | G06F 21/552 726/22 |
| 7,773,587 B2 | 8/2010 | Corcoran | |
| 7,805,140 B2 | 9/2010 | Friday et al. | |
| 7,805,382 B2 | 9/2010 | Rosen et al. | |
| 7,873,352 B2 | 1/2011 | Nguyen et al. | |
| 7,877,621 B2 | 1/2011 | Jacoby et al. | |
| 7,908,357 B2 | 3/2011 | Goranson et al. | |
| 7,924,785 B2 | 4/2011 | Shaheen et al. | |
| 8,041,319 B2 | 10/2011 | He et al. | |
| 8,154,987 B2 | 4/2012 | Yavatkar et al. | |
| 2001/0036834 A1 | 11/2001 | Das et al. | |
| 2002/0007453 A1 | 1/2002 | Nemovicher | |
| 2002/0135515 A1 | 9/2002 | Rankin et al. | |
| 2003/0050959 A1 | 3/2003 | Faybishenko et al. | |
| 2003/0084319 A1* | 5/2003 | Tarquini | H04L 29/06 726/23 |
| 2003/0084344 A1 | 5/2003 | Tarquini et al. | |
| 2003/0110396 A1* | 6/2003 | Lewis | H04L 63/0227 726/4 |
| 2003/0187832 A1 | 10/2003 | Reader | |
| 2003/0219129 A1 | 11/2003 | Whelan et al. | |
| 2004/0111477 A1 | 6/2004 | Boss et al. | |
| 2004/0190902 A1 | 9/2004 | Tamai | |
| 2004/0267876 A1 | 12/2004 | Kakivaya et al. | |
| 2005/0015624 A1* | 1/2005 | Ginter | G06F 21/55 726/4 |
| 2005/0038876 A1 | 2/2005 | Chaudhuri | |
| 2005/0063325 A1 | 3/2005 | Kim et al. | |
| 2005/0088993 A1 | 4/2005 | Jung et al. | |
| 2005/0101309 A1 | 5/2005 | Croome | |
| 2005/0108578 A1* | 5/2005 | Tajalli | G06F 21/316 726/4 |
| 2005/0122940 A1 | 6/2005 | Nian | |
| 2005/0130658 A1 | 6/2005 | Stephens | |
| 2005/0138178 A1 | 6/2005 | Astarabadi | |
| 2005/0141457 A1 | 6/2005 | Lee et al. | |
| 2005/0201330 A1 | 9/2005 | Park et al. | |
| 2005/0216956 A1 | 9/2005 | Orr et al. | |
| 2005/0255847 A1 | 11/2005 | Han et al. | |
| 2005/0259671 A1 | 11/2005 | Jung et al. | |
| 2005/0282547 A1 | 12/2005 | Kim et al. | |
| 2006/0025128 A1 | 2/2006 | Lee | |
| 2006/0078124 A1 | 4/2006 | Whelan et al. | |
| 2006/0089876 A1 | 4/2006 | Boys | |
| 2006/0187873 A1 | 8/2006 | Friday et al. | |
| 2006/0218229 A1 | 9/2006 | Pandey et al. | |
| 2006/0229054 A1 | 10/2006 | Erola et al. | |
| 2006/0274743 A1 | 12/2006 | Yegin et al. | |
| 2007/0067438 A1* | 3/2007 | Goranson | H04L 63/1425 709/224 |
| 2007/0233776 A1 | 10/2007 | Palm | |
| 2008/0076409 A1 | 3/2008 | Hinrikus et al. | |
| 2008/0192691 A1 | 8/2008 | Park et al. | |
| 2008/0285520 A1 | 11/2008 | Forte et al. | |
| 2010/0142484 A1 | 6/2010 | Bachmann et al. | |
| 2010/0322198 A1 | 12/2010 | Friday et al. | |
| 2011/0064063 A1 | 3/2011 | Kim et al. | |
| 2011/0182270 A1 | 7/2011 | Shaheen et al. | |

OTHER PUBLICATIONS

Hao, Fang et al. Fast Payload-Based Flow Estimation for Traffic Monitoring and Network Security. 2005 Symposium on Architectures for Networking and Communications Systems (ANCS). https://ieeexplore.ieee.org/stamp/stamp.jsp?tp=&arnumber=4675281 (Year: 2005).*

Kuo, Wen-Kuang et al. Improved Priority Access, Bandwidth Allocation and Traffic Scheduling for DOCSIS Cable Networks. https://ieeexplore.ieee.org/stamp/stamp.jsp?tp=&arnunnber=1247794 (Year: 2003).*

Aboba, B., et al., "Detecting Network Attachment in IPv4 (DNAv4)", Technical Report, Internet Engineering Task Force, RFC 4436, Mar. 2006, pp. 1-15.

Aboba, B., et al., "Extensible Authentication Protocol (EAP) Key Management Framework", Technical Report, Internet Engineering Task Force Draft, Updates 3748, Nov. 11, 2007, pp. 1-75.

Acme, "Thttpd—Tiny/Turbo/Throttling HTTP Server", Dec. 2006, pp. 1-47, available at: http://www.acme.com/software/thttpd/.

Almeida, V., et al., "Characterizing Reference Locality in the WWW", In Proceedings of the 4th International Conference on Parallel and Distributed Information Systems (PDIS '96), Miami Beach, FL, US, Dec. 18-20, 1996, pp. 92-103.

Antoniadis, P., et al., "Incentives for Content Availability in Memory-Less Peer-to-Peer File Sharing Systems", In ACM SIG on Ecommerce, vol. 5, No. 4, Jul. 2005, pp. 11-20.

Apap, F., et al., "Detecting Malicious Software by Monitoring Anomalous Windows Registry Accesses", In Proceedings of the 5th International Symposium on Recent Advances in Intrusion Detection (RAID '02), Zurich, CH, Oct. 16-18, 2002, pp. 36-53.

Apple, "Bonjour for Developers", last updated Jan. 2016, pp. 1-23, available at: http://developer.apple.com/networking/bonjour/.

Arrington, M., "Another Proximity Based IM Service", last updated Aug. 22, 2006, pp. 1-2, available at: http://techcrunch.com/2006/08/22/another-proximity-based-im-service/.

Arthur, D., et al., "k-means++ The Advantages of Careful Seeding", In Proceedings of the 18th Annual ACM-SIAM Symposium on Discrete Algorithms (SODA), New Orleans, LA, US, Jan. 7-9, 2007, pp. 1027-1035.

Balachandran, A., et al., "Characterizing User Behavior and Network Performance in a Public Wireless LAN", In Proceedings of the

(56) References Cited

OTHER PUBLICATIONS

International Conference on Measurements and Modeling of Computer Systems (SIGMETRICS '02), Marina Del Rey, CA, US, Jun. 15-19, 2002, pp. 195-205.
Bloom, B.H., "Space/Time Trade-Offs in Hash Coding with Allowable Errors", In Communications of the ACM, vol. 13, No. 7, Jul. 1970, pp. 422-426.
Broder, A., et al., "Network Applications of Bloom Filters: A Survey", Internet Mathematics, May 10, 2004, pp. 485-509.
Brookshier, D., et al., "JXTA: Java P2P Programming", Sams Publishing, Mar. 22, 2002, pp. 1-291.
Buragohain, C., et al., "A Game Theoretic Framework for Incentives in P2P Systems", In Proceedings of the 3rd International Conference on Peer-to-Peer Computing (P2P '03), Washington, DC, US, Sep. 1-3, 2003, pp. 48-56.
Buttyan, L., et al., "Spontaneous Cooperation in Multi-Domain Sensor Networks", In Proceedings of the 2nd European Conference on Security and Privacy in Ad-Hoc and Sensor Networks (ESAS '05), Visegrad, HU, Jul. 13-14, 2005, pp. 42-53.
Camarillo, G., et al., "Grouping of Media Lines in the Session Description Protocol (SDP)", Technical Report, Internet Engineering Task Force, RFC 3388, last updated Dec. 2002, pp. 1-20, available at: https://tools.ietf.org/html/rfc3388.
Chandra, R., et al., "WiFiProfiler: Cooperative Diagnosis in Wireless LANs", In Proceedings of the 4th International Conference on Mobile Systems, Applications, and Services (MobiSys '06), Uppsala, SE, Jun. 19-22, 2006, pp. 205-219.
Chardra, R., et al., "MultiNet: Connecting to Multiple IEEE 802.11 Networks Using a Single Wireless Card", In Proceedings of the 23rd Annual Joint Conference of the IEEE Computer and Communications Societies (INFOCOM '04), Hong Kong, HK, Mar. 7-11, 2004, pp. 882-893.
Chow, R. et al., "Authentication in the Clouds: A Framework and its Application to Mobile Users", In Proceedings of the 2010 ACM Workshop on Cloud Computing Security Workshop (CCSW '10), Chicago, IL, US, Oct. 8, 2010, pp. 1-6.
Cisco System, "Inside Cisco IOS Software Architecture", 1st Edition, Cisco Press, Indianapolis, IN, US, Aug. 7, 2000, pp. 1-160.
Cole, R.G. et al., "Requirements on Worm Mitigation Technologies in MANETS", In Proceedings of the Workshop on Principles of Advanced and Distributed Simulation (PADS '05), Monterey, CA, US, Jun. 1-3, 2005, pp. 207-214.
Cole, R.G., "Initial Studies on Worm Propagation in Manets for Future Army Combat Systems", In Proceedings of Army Science Conference (ASC), Orlando, FL, US, Nov. 29-Dec. 2, 2004, pp. 1-8.
Columbia University, "Internet Real Time Lab", last updated: 2016, p. 1, available at: http://www.cs.columbia.edu/IRT/.
Combs, G., et al., "Ethereal: Network Protocol Analyzer", captured on: Apr. 4, 2005, p. 1, available at: https://web.archive.org/web/20050404092031/http://www.ethereal.com/docs/man-pages/ethereal.1.html.
Cretu, G., et al. "Intrusion and Anomaly Detection Model Exchange for Mobile Ad-Hoc Networks", In Proceedings of the IEEE Consumer Communications and Networking Conference (CCNC'06), Las Vegas, NV, US, Jan. 8-10, 2006, pp. 635-639.
Cretu, G., et al., "Data Sanitization: Improving the Forensic Utility of Anomaly Detection Systems", In Proceedings of the 3rd Workshop on Hot Topics in System Dependability (HotDep'07), Edinburgh, UK, Jun. 25-28, 2007, pp. 1-6.
Curl.Haxx, "Libcurl—The Multiprotocol File Transfer Library", last updated Dec. 2006, pp. 1-59, available at: http://curl.haxx.se/libcurl/.
Cygwin, "Cygwin User's Guide", last updated Dec. 2006, pp. 1-70, available at: https://cygwin.com/cygwin-ug-net/cygwin-ug-net.pdf.
DarwinPorts, "DarwinPorts", last updated Jun. 15, 2006, pp. 1-103, available at: http://www.darwinports.org/.
Day, M., et al., "A Model for Presence and Instant Messaging", Technical Report, Internet Engineering Task Force, RFC 2778, last updated: Feb. 2000, pp. 1-16.
Dodgeball, "Dodgeball", last updated Jul. 10, 2008, pp. 1-4, available at: https://web.archive.org/web/20080710102859/http://www.dodgeball.com/help.
Dressler, G., et al., "Attack Detection Using Cooperating Autonomous Detections Systems (CATS)", In Wilhelm-Schickard Institue of Computer Science, Computer Networks and Internet, Jan. 2004, pp. 1-15.
Droms, R., "Dynamic Host Configuration Protocol", Technical Report, RFC 2131, Mar. 1997, pp. 1-43.
Eisenstadt, M., "Improving Radius IM for Geolocation + Chat", last updated Nov. 1, 2006, pp. 1-4, available at: http://eisenstadt.wordpress.com/2006/11/01/.
Ertaul, L. and Lu, W., "ECC Based Threshold Cryptography for Secure Data Forwarding and Secure Key Exchange in MANET(I)", In Proceedings of 4th International IFIP-TC6 Networking Conference, Waterloo, CA, May 2-6, 2005, pp. 102-113.
Eskin, E., "Anomaly Detection Over Noisy Data Using Learned Probability Distributions", In Proceedings of the 17th International Conference on Machine Learning, Stanford, CA, US, Jun. 29-Jul. 2, 2000, pp. 255-262.
Feldman, M., et al., "Robust Incentive Techniques for Peer-to-Peer Networks", In Proceedings of the 5th ACM Conference on Electronic Commerce (EC '04), New York, NY, US, May 17-20, 2004, pp. 102-111.
Ferrailo, D., et al., "Role-Based Access Control (RBAC): Features and Motivations", In Proceedings of the 11th Annual Computer Security Application Conference, New Orleans, LA, US, Dec. 11-15, 1995, pp. 241-247.
Forte, A.G., et al., "IEEE 802.11 in the Large: Observations at the IETF Meeting", Technical Report CUCS-025-08, Computer Science Department, Columbia University, Jan. 2008, pp. 1-10.
Forte, A.G., et al., "Improving L3 Handoff Delay in IEEE 802.11 Wireless Networks", In Proceedings of the 2nd Annual International Wireless Internet Conference (WICON '06), Boston, MA, USA, Aug. 2-5, 2006, pp. 1-8.
Frank!, P.G. et al., "Delivering Information 'To Go' via Infostations", Technical Report WICAT TR 02-008, Polytechnic University, Nov. 2002, pp. 1-14.
FreeRadius, "The FreeRADIUS Project", last updated May 2010, pp. 1-6, available at: http://www.freeradius.org/.
Fretzagias, C., et al., "Cooperative Location-Sensing for Wireless Networks", In Proceedings of the 2nd IEEE International Conference on Pervasive Computing and Communications (PerCom '04), Orlando, FL, US, Mar. 14-17, 2004, pp. 121-131.
Freudenthal, E., et al., "dRBAC: Distributed Role-based Access Control for Dynamic Coalition Environments", In Proceedings of the 22nd IEEE International Conference on Distributed Computing Systems (ICDCS), Vienna, AT, Jul. 2-5, 2002, pp. 411-420.
Frias-Martinez, V., et al., "Behavior-Based Network Access Control: A Proof-of-Concept", In Proceedings of the 11th Information Security Conference, Taipei, TW, Sep. 15-Sep. 19, 2008, pp. 175-190.
Garcia-Luna-Aceves, J., et al., "Wireless Internet Gateways (WINGs)", In Proceedings of the IEEE Military Communications Conference (MILCOM), Monterey, CA, US, Nov. 1997, pp. 1271-1276.
Ghodosi, H., et al., "Dynamic Threshold Cyptosystems: A New Scheme in Group Oriented Cryptography", In Proceedings of the International Conference on the Theory and Applications of Cryptology (ASIACRYPT'96), Kyongju, KR, Nov. 14-18, 1996, pp. 370-379.
Gnutella, "Gnutella Protocol Development", captured on: Apr. 5, 2005, pp. 1-170, available at: https://web.archive.org/web/20050403213059/http://www.the-gdf.org/wiki/index.php?title=Main_Page.
GreenPacket, "SONbuddy Now Available Online", captured on: Aug. 18, 2014, pp. 1-2, available at: https://web.archive.org/web/20140818134952/http://www.greenpacket.com/company/news_detail.asp?id=82.
Günes, M. and Spaniol, O., "Routing Algorithms for Mobile Multi-Hop Ad-Hoc Networks", In Proceedings of International Workshop on Next Generation Network Technologies, Oct. 2002, pp. 10-24.
Hartigan, J.A., and Wong, M.A., "A K-Means Clustering Algorithm", In Applied Statistics, vol. 28, No. 1, Jan. 1979, pp. 100-108.

(56) References Cited

OTHER PUBLICATIONS

Harvard, "RSS 2.0 Specification", last updated: Jul. 15, 2003, pp. 1-6, available at: http://blogs.law.harvard.edu/tech/rss.

Hayes, A. and Wilson, D., "Peer-to-Peer Information Sharing in a Mobile Ad Hoc Environment", In Proceedings of the 6th IEEE Workshop on Mobile Computing Systems and Applications (WMCSA '04), Lake District National Park, UK, Dec. 2-10, 2004, pp. 154-162.

Heinemann, V., et al., "iClouds—Peer-to-Peer Information Sharing in Mobile Environments", In Proceedings of the 9th International Euro-Par Conference (Euro-Par '03), Klagenfurt, AT, Aug. 26-29, 2003, pp. 1038-1045.

Henderson, T., et al., "The Changing Usage of a Mature Campus-Wide Wireless Network", In Proceedings of the 10th Annual International Conference on Mobile Computing and Networking (MobiCom '04), Philadelphia, PA, USA, Sep. 26-Oct. 1, 2004, pp. 187-201.

Hershkop, S., et al., "Host-Based Anomaly Detection Using Wrapping File Systems", Technical Report CUCS-018-04, Columbia University, Apr. 24, 2004, pp. 1-20.

Herzberg, A., et al., "Proactive Secret Sharing Or: How to Cope with the Perpetual Leakage", In Advance in Cryptology (CRYPTO), Santa Barbara, CA, US, Aug. 27-31, 1995, pp. 339-352.

Hsieh, R., et al., "S-MIP: A Seamless Handoff Architecture for Mobile IP", In Proceedings of the 22nd Annual Joint Conference of the IEEE Computer and Communications Societies (INFOCOM '03), San Franciso, CA, USA, Apr. 1-3, 2003, pp. 1774-1784.

Huang, Q. et al., "Secure Data Forwarding in Wireless Ad Hoc Networks", In IEEE International Conference on Communcations, vol. 5, May 16-20, 2005, pp. 3525-3531.

Huang, Y. and Lee, W., "A Cooperative Intrusion Detection System for Ad Hoc Networks", In Proceedings of the 1st ACM Workshop on Security of Ad Hoc and Sensor Networks (SASN '03), Fairfax, VA, US, Oct. 2003, pp. 135-147.

Huang, Y., et al., "Cross-Feature Analysis for Detecting Ad-Hoc Routing Anomalies", In Proceedings of the 23rd International Conference on Distributed Computing Systems (ICDCS '03), Providence, RI, US, May 19-22, 2003, pp. 478-789.

Hunter, T.E. and Nosratinia, A., "Diversity Through Coded Cooperation", In IEEE Transactions on Wireless Communications, vol. 5, No. 2, Feb. 2006, pp. 283-289.

IEEE Computer Society, "Draft IEEE Standard for Local and Metropolitan Area Networks: Media Independent Handover Services", White Paper, Jan. 2006, pp. 1-158.

IEEE Computer Society, "Draft Recommended Practice for Multi-Vendor Access Point Interoperability via an Inter-Access Point Protocol Across Distribution Systems Supporting IEEE 802.11 Operation", White Paper, Jan. 2003, pp. 1-79.

IEEE Computer Society, "IEEE Draft Amendment to Standard for Information Technology, Telecommunications and Information Exchange Between Systems, LAN/MAN, Specific Requirements—Part 11: Wireless LAN MAC and Physical Layer (PHY) Specifications", White Paper, Mar. 2006.

IEEE Computer Society, "IEEE Standard for Information Technology, Telecommunications and Information Exchange Between Systems, Local and Metropolitan Area Networks, Specific Requirements—Amendment 6: Medium Access Control (MAC) Security Enhancements", White Paper, Jul. 23, 2004, pp. 1-175.

IEEE Computer Society, "IEEE Standard for Information Technology, Telecommunications and Information Exchange Between Systems, Local and Metropolitan Area Networks, Specific Requirements—Amendment 8: Medium Access Control (MAC) Quality of Service Enhancements", White Paper, Nov. 11, 2005, pp. 1-189.

Iera et al., "Improving QoS and Throughput in Single and Multihop WLANs Through Dynamic Traffic Prioritization", In IEEE Network, vol. 19, No. 4, Jul. 2005, pp. 35-44, available at: http://ieeexplore.ieee.org/stamp/stamps.jsp?arnumber=1470681.

International Patent Application No. PCT/US2006/042713, filed Oct. 31, 2006.

International Patent Application No. PCT/US2006/045000, filed Nov. 20, 2006.

International Patent Application No. PCT/US2007/022188, filed Oct. 17, 2007.

International Patent Application No. PCT/US2008/058294, filed Mar. 26, 2008.

International Preliminary Report on Patentability dated Apr. 9, 2009 in International Patent Application No. PCT/US2006/042713.

International Preliminary Report on Patentability dated May 14, 2007 in International Patent Application No. PCT/US2006/045000.

International Preliminary Report on Patentability dated Jun. 20, 2008 in International Patent Application No. PCT/US2007/022188.

International Preliminary Report on Patentability dated Aug. 21, 2008 in International Patent Application No. PCT/US2008/058294.

International Search Report and Written Opinion dated Apr. 9, 2008 in International Patent Application No. PCT/US2006/042713.

International Search Report in International Patent Application No. PCT/US2006/045000, filed Nov. 20, 2006, dated May 14, 2007.

International Search Report in International Patent Application No. PCT/US2007/022188, filed Oct. 17, 2007, dated Jun. 20, 2008.

International Search Report in International Patent Application No. PCT/US2008/058294, filed Mar. 26, 2008, dated Aug. 21, 2008.

Internet System Consortium, "DHCP Distribution Version 3.0.7 README File", last updated: May 16, 2008, available at: https://web.archive.org/web/20080516001440/http://www.isc.org/sw/dhcp/.

Internet System Consortium, "Dynamic Host Configuration Protocol (DHCP)", last updated: Dec. 21, 2016, available at: https://www.isc.org/downloads/dhcp/.

Jardosh, A.P., et. al., "Understanding Link-Layer Behavior in Highly Congested IEEE 802.11b Wireless Networks", In Proceedings of the 2005 ACM SIGCOMM Workshop on Experimental Approached to Wireless Network Design and Analysis (E-WIND '05), Philadelphia, PA, USA, Aug. 22-26, 2005, pp. 11-16.

Jelenkovic, P. and Radovanovic, A., "Asymptotic Insensitivity of Least-Recently-Used Caching to Statistical Dependency", In Proceedings of the 22nd Annual Joint Conference of the IEEE Computer and Communications Societies (INFOCOM '03), San Francisco, CA, USA, Mar. 30-Apr. 3, 2003, pp. 438-447.

Johnson, D.B., et al., "DSR: The Dynamic Source Routing Protocol for Multihop Wireless Ad Hoc Networks", In Ad Hoc Networking, 1st Edition, Addison-Wesley Professional, Boston, MA, US, Jan. 8, 2001, pp. 139-172.

JXTA, "JXTA Community Project", captured on: Apr. 6, 2007, pp. 1-6, available at: https://web.archive.org/web/20070406175558/http://www.jxta.org/.

Kempf, J., et al., "Detecting Network Attachment in IPv6 Networks (DNAv6)", Technical Report, Internet Engineering Task Force Internet Draft, last updated: Jun. 25, 2006, pp. 1-36, available at: https://tools.ietf.org/html/draft-ietf-dna-protocol-01.

Kershaw, M., et al., "Kismet: 802.11 Layer 2 Wireless Network Sniffer", last updated: Jan. 2016, pp. 1-4, available at: https://www.kismetwireless.net/documentation.shtml, pp. 1-26.

Klemm, A., et al., "A Special-Purpose Peer-to-Peer File Sharing System for Mobile Ad Hoc Networks", In Proceedings of the IEEE Vehicular Technology Conference (VTC '03-Fall), Orlando, FL, USA, Oct. 6-9, 2003, pp. 2758-2763.

Klensin, J., "Simple Mail Transfer Protocol", Technical Report, Internet Engineering Task Force, RFC 2821, last updated: Apr. 2001, pp. 1-79, available at: https://www.ietf.org/rfc/rfc2821.txt.

Kong, J., et al., "Providing Robust and Ubiquitous Security Support for Mobile Ad-Hoc Networks", In Proceedings of the International Conference on Network Protocols (ICNP), Riverside, CA, US, Nov. 11-14, 2001, pp. 1-34.

Kortuem, G., et al., "When Peer-to-Peer Comes Face-to-Face: Collaborative Peer-to-Peer Computing in Mobile Ad Hoc Networks", In Proceedings of the 1st International Conference on Peer-to-Peer Computing (P2P '01), Linköping, SE, Aug. 27-29, 2001, pp. 75-91.

Koutsonikolas, D., et al., "CoCoA: Coordinated Cooperative Localization for Mobile Multi-Robot Ad Hoc Networks", In Proceedings of the 26th IEEE International Conference on Distributed Computing Systems Workshops (ICDCS '06), Lisbon, PT, Jul. 4-7, 2006, pp. 1-6.

(56) References Cited

OTHER PUBLICATIONS

Kumar, S., et al., "Medium Access Control Protocols for Ad Hoc Wireless Networks: A Survey", In Ad Hoc Networks, vol. 4, No. 3, May 2006, pp. 326-358.
Lara, M.R., "Public Internet Project Website", captured on: Jul. 2006, pp. 1-9, available at: https://web.archive.org/web/20060714061954/http://publicinternetproject.org/.
Leaf-Project, "Linux Embedded Application Firewall (Leaf)", captured on: Aug. 10, 2007, pp. 1-2, available at: https://web.archive.org/web/20070810171101/http://www.leaf-project.org/.
Leiner, B., et al., "Goals and Challenges of the DARPA GloMo Program", In IEEE Personal Communications, vol. 3, No. 6, Dec. 1996, pp. 34-43.
Lemon, T. and Sommerfield, B., "Node-Specific Client Identifiers for Dynamic Host Configuration Protocol Version Four (DHCPv4)", Technical Report, Internet Engineering Task Force, RFC 4361, last updated: Feb. 2006, pp. 1-12.
Leon, E., et al., "Anomaly Detection Based on Unsupervised Niche Clustering with Application to Network Intrusion Detection", In Genetic and Evolutionary Computation (GECCO), Jun. 19-23, 2004, pp. 502-508.
LightTPD, "LightTPD: The Painless Way-Manual", last updated: Oct. 31, 2016, pp. 1-189, available at: http://www.lighttpd.net/.
Lin, A., and Brown, R., "The Application of Security Policy to Role-Based Access Control and the Common Data Security Architecture", In Computer Communications, vol. 23, No. 17, Nov. 2000, pp. 1584-1593.
Liu, P., et al., "A Cooperative MAC Protocol for Wireless Local Area Networks", In Proceedings of the IEEE International Conference on Communications (ICC '05), Seoul, KR, May 16-20, 2005, pp. 2962-2968.
Locasto, M.E. et al., "Collaborative Distributed Intrusion Detection", Technical Report CUCS-012-04, Computer Science Department, Columbia University, Mar. 8, 2004, pp. 1-18.
Longo, C., "Your Wireless Future", last updated: Jun. 1, 2006, pp. 1-6, available at: http://money.cnn.com/magazines/business2/business2_archive/2006/05/01/8375915/index.htm.
Mahoney, M. et al., "Detecting Novel Attacks by Identifying Anomalous Network Packet Headers", Technical Report CS-2001-2, Florida Institute of Technology, Oct. 2001, pp. 1-10.
Malinen, J., "Host AP Driver for Intersil Prism2/2.5/3, Hostapd, and WPA Supplicant", last updated: 2013, pp. 1-4., available at: http://hostap.epitest.fi.
Malinen, J., "Linux WPA/WPA2/IEEE 802.1x Supplicant", last updated: 2005, pp. 1-5, available at: http://hostap.epitest.fi/wpa_supplicant.
Mangold, S. and Berlemann, L., "IEEE 802.11k: Improving Confidence in Radio Resource Measurements", In Proceedings of the IEEE 16th International Symposium on Personal, Indoor and Mobile Radio Communications (PIMRC '05), Berlin, DE, Sep. 11-14, 2005, pp. 1009-1013.
Meetro, "Meetro", Wikipedia, last updated: Nov. 13, 2016, pp. 1-3, available at: http://en.wikipedia.org/wiki/Meetro.
Microsoft TechNet, "People Near Me", last updated: Sep. 27, 2006, pp. 1-6, available at: http://technet.microsoft.com/en-us/library/bb726969.aspx.
Mishra, A. and Nadkarni, K.M., "Security in Wireless Ad Hoc Networks", In The Handbook of Ad Hoc Wireless Networks, 1st Edition, CRC Press, Boca Raton, FL, US, Dec. 26, 2002, pp. 1-51.
Mishra, A., et al., "An Empirical Analysis of the IEEE 802.11 MAC Layer Handoff Process", In ACM SIGCOMM Computer Communication Review, vol. 33, No. 2, Apr. 2003, pp. 93-102.
Mitzenmacher, M., "Compressed Bloom Filters", In Proceedings of the 20th Annual ACM Symposium on Principles of Distributed Computing (PODC '01), Newport, RI, US, Aug. 26-29, 2001, pp. 144-150.
Narasimha, M., et al.,"On the Utility of Distributed Cryptography in P2P and MANETs: The Case of Membership Control", In Proceedings of the 11th International Conference on Network Protocol (ICNP), Atlanta, GA, US, Nov. 4-7, 2003, pp. 336-345.

Necula, G.C. and Lee, P., "Efficient Representation and Validation of Proofs", In Proceedings of the 13th Annual IEEE Symposium on Logic in Computer Science (LICS '98), Indianapolis, IN, US, Jun. 21-24, 1998, pp. 92-104.
Necula, G.C. and Lee, P., "Safe Kernel Extensions Without Run-Time Checking" In Proceedings of the 2nd USENIX Symposium on Operating Systems Design and Implementation (OSDI '96), Seattle, WA, US, Oct. 29-Nov. 1, 1996, pp. 229-243.
Necula, G.C., "Proof-Carrying Code", In Proceedings of the 24th ACM SIGPLAN—SIGACT Symposium on Principles of Programming Languages (POPL '97), Paris, FR, Jan. 15-17, 1997, pp. 106-119.
Nikolaidis et al., "Management Traffic in Emerging Remote Configuration Mechanisms for Residential Gateways and Home Devices", In IEEE Communications Magazine, vol. 43, No. 5, Jun. 2005, pp. 154-162, available at: http://ieeexplore.ieee.org/stamp/stamp.jsp?arnumber=1453438.
Notice of Allowance dated Apr. 13, 2016 in U.S. Appl. No. 12/092,224.
Notice of Allowance dated Jan. 27, 2014 in U.S. Appl. No. 12/125,617.
Notice of Allowance dated Apr. 12, 2013 in U.S. Appl. No. 12/593,209.
Office Action dated Apr. 8, 2013 in U.S. Appl. No. 12/125,617.
Office Action dated May 6, 2014 in U.S. Appl. No. 12/092,224.
Office Action dated May 8, 2012 in U.S. Appl. No. 12/092,224.
Office Action dated May 24, 2012 in U.S. Appl. No. 12/125,617.
Office Action dated Jul. 19, 2013 in U.S. Appl. No. 12/092,224.
Office Action dated Jul. 22, 2011 in U.S. Appl. No. 12/125,617.
Office Action dated Aug. 20, 2012 in U.S. Appl. No. 12/593,209.
Office Action dated Oct. 2, 2012 in U.S. Appl. No. 12/092,224.
Office Action dated Oct. 26, 2011 in U.S. Appl. No. 12/593,209.
Office Action dated Nov. 17, 2015 in U.S. Appl. No. 12/092,224.
Office Action dated Dec. 1, 2014 in U.S. Appl. No. 12/092,224.
Orbit, "Orbit Architecture", last updated: Jul. 2016, pp. 1-2, available at: http://www.orbit-lab.org.
Papadopouli, M. and Schulzrinne, H., "Design and Implementation of a Peer-to-Peer Data Dissemination and Prefetching Tool for Mobile Users", In Proceedings of the First New York Metro Area Networking Workshop, Hawthorne, NY, USA, Mar. 12, 2001, pp. 1-7.
Papadopouli, M. and Schulzrinne, H., "Effects of Power Conservation", In Proceedings of the 2nd ACM International Symposium on Mobile Ad Hoc Networking and Computing (MobiHoc '01), Long Beach, CA, US, Oct. 4-5, 2001, pp. 117-127.
Papadopouli, M. and Schulzrinne, H., "Seven Degrees of Separation in Mobile Ad Hoc Networks", In Proceedings of the IEEE Global Telecommunications Conference (GLOBECOM '00), San Francisco, CA, US, Nov. 27-Dec. 1, 2000, pp. 1707-1711.
Papadopoulous, C., et al., "Cossack: Coordinated Suppression of Simultaneous Attacks", In Proceedings of DARPA Information Survivability Conference and Exposition (DISCEX III), Washington, DC, US, Apr. 22-23, 2003, pp. 1-12.
Parekh, J., et al., "Privacy-Preserving Payload-Based Correlation for Accurate Malicious Traffic Detection", In Large Scale Attack Defense (LASD), Pisa, IT, Sep. 11-15, 2006, pp. 99-106.
Parker, J., et al., "On Intrusion Detection and Response for Mobile Ad Hoc Networks", In Proceedings of the 2004 IEEE International Conference on Performance, Computing, and Communications (IPCCC), Phoenix, AZ, US, Apr. 15-17, 2004, pp. 747-752.
Patwardhan, A. et al., "Secure Routing and Intrusion Detection in Ad Hoc Networks", In Proceedings of the 3rd IEEE International Conference on Pervasive Computing and Communications (PerCom '05), Kauai, HI, US, Mar. 8-12, 2005, pp. 191-199.
Payer, Udo, "State-Driven Stack-Based Network Intrusion Detection System", In Proceedings of the 7th International Conference on Telecommunications, Zagreb, HR, Jun. 11-13, 2003, pp. 613-618.
PC Engines, "Wireless Router Application Platform", last updated: Dec. 2006, pp. 1-77, available at: http://www.pcengines.ch/wrap.htm.
Pedersen, T.P., "A Threshold Cryptosystem without a Trusted Party", In Proceedings of the 10th Annual International Conference on Theory and Application of Cryptographic Techniques (EUROCRYPT '91), Brighton, UK, Apr. 8-11, 1991, pp. 522-526.

(56) References Cited

OTHER PUBLICATIONS

Perkins, C.E. and Johnson, D.B., "Route Optimization for Mobile IP", In Journal for Cluster Computing, vol. 1, No. 2, Jan. 1998, pp. 161-176.

Perkins, C.E., and Royer, E.M., "Ad-Hoc On-Demand Distance Vector Routing", In Proceeding of the 2nd Workshop on Mobile Computing Systems and Applications (WMCSA '99), New Orleans, LA, US, Feb. 25-26, 1999, pp. 90-100.

Plazes, "FAQ—What's Plazes", captured on: Apr. 17, 2006, pp. 1-6, available at: https://web.archive.org/web/20060417083416/http://www.plazes.com/info/whatis/.

PorchDog Software, "Howl: Man's New Best Friend", captured on: Mar. 15, 2005, pp. 1-2, available at: https://web.archive.org/web/20050315005338/http://www.porchdogsoft.com/products/howl/.

Portnoy, L., et al., "Intrusion Detection With Unlabeled Data Using Clustering", In Proceedings of ACM CSS Workshop on Data Mining Applied to Security (DMSA-2001); Philadelphia, PA, US, Nov. 5, 2001, pp. 1-25.

Price, G., "Google Makes An Acquisition: Dodgeball.com", captured on: May 14, 2005, pp. 1-2, available at: https://web.archive.org/web/20050514000730/http://blog.searchenginewatch.com/blog/050511-194257.

Ramani, I. and Savage, S., "SyncScan: Practical Fast Handoff for 802.11 Infrastructure Networks", In Proceedings of the 24th Annual Joint Conference of the IEEE Computer and Communications Societies (INFOCOM '05), Miami, FL, USA, Mar. 13-17, 2005, pp. 675-684.

RelaxNG, "Relax NG Home Page", last updated: Feb. 25, 2014, pp. 1-385, available at: http://www.relaxng.org/.

Rigney, C., et al., "Remote Authentication Dial In User Service (RADIUS)", Technical Report, RFC 2865, last updated Jun. 2000, pp. 1-79, available at: https://tools.ietf.org/html/rfc2865.

Rosenberg, J., et al., "SIP: Session Initiation Protocol", Technical Report, Internet Engineering Task Force, RFC 3261, Jun. 2002, pp. 1-202, available at: http://www.ietf.org/rfc/rfc3261.txt.

Schosser, S., et al., "Incentives Engineering for Structured P2P Systems—A Feasibility Demonstration Using Economic Experiments", In Proceedings of the 7th ACM Conference on Electronic Commerce (EC '06), Ann Arbor, MI, USA, Jun. 11-15, 2006, pp. 280-289.

Schulzrinne, H. and Wedlund, E., "Application-Layer Mobility Using SIP", In Mobile Computing and Communications Review, vol. 4, No. 3, Jul. 2000, pp. 47-57.

Shamir, A., "How to Share a Secret", in Communications of the ACM, vol. 22, No. 11, Nov. 1979, pp. 612-613.

Shin, S., et al., "Reducing MAC Layer Handoff Latency in IEEE 802.11 Wireless LANs", In Proceedings of the 2nd International Workshop on Mobility Management & Wireless Access Protocols (MOBIWAC '04), Philadelphia, PA, USA, Oct. 1, 2004, pp. 19-26.

Simone, D., "802.11k Makes WLANs Measure Up", Network World, Mar. 29, 2004, pp. 1-2, available at: http://www.networkworld.com/article/2331683/tech-primers/802-11k-makes-wlans-measure-up.html.

Singel, R., "Meetro Eases Hookups in Your Hood", captured on: Jul. 22, 2013, pp. 1-2, available at: https://web.archive.org/web/20130722204832/http://www.wired.com/culture/lifestyle/news/2005/09/69023.

Snort, "Snort Ruleset", last updated: 2016, pp. 1-3, available at: https://www.snort.org/downloads.

Snurchy, "Meetro Beta User Reviews", pp. 1-5, captured on: Nov. 7, 2013, available at: https://web.archive.org/web/20131107052611/http://reviews.cnet.com/instant-messaging/meetro-beta/4852-9237_7-31485538.html.

Spinosa, E., et al., "OLINDDA: A Cluster-Based Approach for Detecting Novelty and Concept Drift in Data Streams", In Proceedings of the ACM Symposium on Applied Computing, Seoul, KR, Mar. 11-15, 2007, pp. 448-452.

SQLite, "SQLite", SQLite.org, last updated: Nov. 28, 2016, pp. 1-259, available at: http://www.sqlite.org/.

Stafford, B., "libESMTP", captured on: Feb. 5, 2016, pp. 1-37, available at: https://web.archive.org/web/20160205111045/http://www.stafford.uklinux.net/libesmtp/.

Stamouli, I., et al., "Real-Time Intrusion Detection for Ad Hoc Networks", In Proceedings of the 6th IEEE International Symposium on a World of Wireless Mobile and Multimedia Networks (WOWMOM '05), Taormina, IT, Jun. 13-16, 2005, pp. 374-380.

Stefanov, A. and Erkip, E., "Cooperative Space-Time Coding for Wireless Networks", In IEEE Transactions on Communications, vol. 53, No. 11, Nov. 14, 2005, pp. 1804-1809.

Sterne, D. et al., "A General Cooperative Intrusion Detection Architecture for MANETs", In Proceedings of the 3rd IEEE International Workshop on Information Assurance (IWIA '05), College Park, MD, US, Mar. 23-24, 2005, pp. 57-70.

Stolfo, S., "JAM: Java Agents for Meta-Learning for Distributed Data Mining", In Proceedings of the Third International Conference on Knowledge Discovery and Data Mining (KDD-97), Newport Beach, CA, US, Aug. 14-17, 1997, pp. 74-81.

Stolfo, S.J. et al., "A Comparative Evaluation of Two Algorithms for Windows Registry Anomaly Detection", In Journal of Computer Security, vol. 13, No. 4, Jul. 2005, pp. 659-693.

Subhadrabandhu, D. et al., "Efficacy of Misuse Detection in Adhoc Networks", In First Annual IEEE Communications Society Conference on Sensor and Ad Hoc Communications and Networks (SECON '04), Santa Clara, CA, US, Oct. 4-7, 2004, pp. 97-107.

Sun, B. et al., "Alert Aggregation in Mobile Ad Hoc Networks", In Proceedings of the 2nd ACM Workshop on Wireless Security (WiSe '03), San Diego, CA, US, Sep. 19, 2003, pp. 69-78.

Sun, B., et al., "Zone-Based Intrusion Detection for Mobile Ad Hoc Networks", In International Journal of Ad Hoc & Sensor Wireless Networks, vol. 2, No. 3, Dec. 2006, pp. 297-324.

Swish-e, "Swish-e: Simple Web Indexing System for Humans-Enhanced Website", captured on: Dec. 5, 2006, pp. 1-247, available at: https://web.archive.org/web/20061205015141/http://swish-e.org/.

Takaragi, K., "A Threshold Digital Signature Issuing Scheme without Secret Communication", Technical Report IEEE P1363, Nov. 1998, pp. 1-18.

Tew, C., "The First P2P PVR from NDS Plus Innovative 'Distributed DVR'", PVRWire.com, Jan. 29, 2007, pp. 1-5, available at: http://www.pvrwire.com/2007/01/29/announcements-from-nds/.

U.S. Appl. No. 12/092,224, filed Apr. 7, 2011.
U.S. Appl. No. 12/125,617, filed May 22, 2008.
U.S. Appl. No. 12/593,209, filed Nov. 23, 2009.
U.S. Appl. No. 60/732,019, filed Oct. 31, 2005.
U.S. Appl. No. 60/732,457, filed Nov. 1, 2005.
U.S. Appl. No. 60/739,137, filed Nov. 22, 2005.
U.S. Appl. No. 60/778,008, filed Feb. 28, 2006.
U.S. Appl. No. 60/808,313, filed May 24, 2006.
U.S. Appl. No. 60/813,022, filed Jun. 13, 2006.
U.S. Appl. No. 60/852,449, filed Oct. 17, 2006.
U.S. Appl. No. 60/903,197, filed Feb. 22, 2007.
U.S. Appl. No. 60/920,240, filed Mar. 26, 2007.

Vali, D., et al., "A SIP-Based Method for Intra-Domain Handoffs", In Proceedings of the 58th IEEE Vehicular Technology Conference (VTC '03-Fall), Orlando, FL, US, Oct. 6-9, 2003, pp. 2068-2072.

Vigna, G. et al., "An Intrusion Detection Tool for AODV-Based Ad hoc Wireless Networks", In Proceedings of the 20th Annual Computer Security Applications Conference (ACSAC '04), Tucson, AZ, US, Dec. 6-10, 2004, pp. 16-27.

VX Heavens, available at: https://web.archive.org/web/20070429163350/http://vx.netlux.org:80/, captured on: Apr. 29, 2007, pp. 1.

Wagner, D. and Soto, P., "Mimicry Attacks on Host-Based Intrusion Detection Systems", In Proceedings of the 9th ACM Conference on Computer and Communications Security (CCS '02), Washington, DC, USA, Nov. 18-22, 2002, pp. 255-264.

Wang, F. et al., "Intrusion Detection for Link State Routing Protocol through Integrated Network Management", In the Eighth International Conference on Computer Communications and Networks, Boston, MA, US, Oct. 11-13, 1999, pp. 634-639.

Wang, K. and Stolfo, S.J., "Anomalous Payload-Based Network Intrusion Detection", In Proceedings of the 7th International Sym-

(56) References Cited

OTHER PUBLICATIONS posium on Recent Advances in Intrusion Detection (RAID '04), Sophia Antipolis, FR, Sep. 15-17, 2004, pp. 203-222.

Wang, K. et al., "Anagram: A Content Anomaly Detector Resistant to Mimicry Attack", In Proceedings of the 9th International Conference on Recent Advances in Intrusion Detection, Hamburg, DE, Sep. 20-22, 2006, pp. 226-248.

Wang, K. et al., "Anomalous Payload-Based Worm Detection and Signature Generation", In Proceedings of the 8th International Symposium on Recent Advances in Intrusion Detection (RAID '05), Seattle, WA, US, Sep. 7-9, 2005, pp. 227-246.

Widmer, G. and Kubat, M., "Learning in the Presence of Concept Drift and Hidden Context", In Machine Learning, vol. 23, No. 1, Apr. 1996, pp. 69-101.

Wiki.Theory, "Bittorrent Protocol Specification 1.0", last updated Dec. 5, 2016, pp. 1-19, available at: http://wiki.theory.org/BitTorrentSpecification.

Wolf, B.J., et al. "Distributed Formation of Broadcast Transmission Schedules for Mobile Ad Hoc Networks", In IEEE Military Communications Conference (MILCOM), Oct. 31-Nov. 3, 2004, pp. 1268-1274.

Wongrujira, K. and Seneviratne, A., "Monetary Incentive with Reputation for Virtual Market-Place Based P2P", In Proceedings of the 2005 ACM Conference on Emerging Network Experiment and Technology, (CoNEXT '05), Toulouse, FR, Oct. 24-27, 2005, pp. 135-145.

Wu, C.H., et al., "Bi-Directional Route Optimization in Mobile IP Over Wireless LAN", In Proceedings of the 56th IEEE Vehicular Technology Conference (VTC '02-Fall), vol. 2, Vancouver, BC, CA, Sep. 24-28, 2002, pp. 1168-1172.

Yi, J.H. and Tsudik, G., "Threshold Cryptography in P2P and MANETs: The Case of Access Control", In Journal of Computer Networks, vol. 51, No. 12, Aug. 2007, pp. 3632-3649.

Yokota, H., et al., "Link Layer Assisted Mobile IP Fast Handoff Method Over Wireless LAN Networks", In Proceedings of the 8th Annual International Conference on Mobile Computing and Networking (MobiCom '02), Atlanta, GA, USA, Sep. 23-26, 2002, pp. 131-139.

Yuen, W.H. and Schulzrinne, H., "Performance Evaluation of Time-Based and Hop-Based TTL Schemes in Partially Connected Ad Hoc Networks", In Proceedings of the IEEE International Conference on Communications (ICC '06), Istanbul, TR, Jun. 11-15, 2006, pp. 3844-3849.

Zayrel, J., "An Empirical Re-Examination of Weighted Voting for k-NN", In Proceedings of the 7th Belgian-Dutch Conference on Machine Learning (BeNeLearn'97), Tilburg, NE, Oct. 21, 1997, pp. 139-148.

ZeroConf, "Zero Configuration Networking (Zeroconf)", last updated: Oct. 2013, pp. 1-114, available at: http://www.zeroconf.org/.

Zhang, Y., and Lee, W., "Intrusion Detection in Wireless Ad-Hoc Networks", In Proceedings of the Sixth Annual International Conference on Mobile Computing and Networking (MobiCom '00), Boston, MA, US, Aug. 6-11, 2000, pp. 275-283.

Zhang, Y., et al., "Intrusion Detection Techniques for Mobile Wireless Networks", In Wireless Networks Journal, vol. 9, No. 5, Sep. 2003, pp. 545-556.

\* cited by examiner

| | 702 | 703 | 704 | 705 | 706 |
|---|---|---|---|---|---|
| Node 1 | m_in_1 | m_out_1 | mw_1 | Thc_out_1 | dist{{in,out,w}2,{in,out,w}1} |
| Node 3 | m_in_3 | m_out_3 | mw_3 | Thc_out_3 | dist{{in,out,w}2,{in,out,w}3} |
| Node 4 | m_in_4 | m_out_4 | mw_4 | Thc_out_4 | dist{{in,out,w}2,{in,out,w}3} |

Model Table for Node 2

FIG. 7

METHODS, MEDIA, AND SYSTEMS FOR SECURING COMMUNICATIONS BETWEEN A FIRST NODE AND A SECOND NODE

CROSS-REFERENCE TO RELATED APPLICATIONS

This application is a continuation of U.S. patent application Ser. No. 15/221,384, filed Jul. 27, 2016, which is a continuation of U.S. patent application Ser. No. 12/092,224, filed Apr. 7, 2011, which is a national stage application under 35 U.S.C. § 371 of International Application No. PCT/US2006/042713, filed Oct. 31, 2006, which claims the benefit of U.S. Provisional Patent Application No. 60/732,019, filed Oct. 31, 2005, and of U.S. Provisional Patent Application No. 60/808,313, filed May 24, 2006, each of which is hereby incorporated by reference herein in its entirety.

TECHNICAL FIELD

The disclosed subject matter relates to methods, media, and systems for securing communications between a first node and a second node.

BACKGROUND

Digital processing devices can be attacked by other digital processing devices with which they are communicating. Accordingly, some digital processing devices only accept communication from devices that they trust. A device can establish trust of a requesting device by, for example, examining information identifying the requesting device or information describing the type or configuration of the requesting device. However, such information may not always be a useful predictor of whether a device is, for example, already infected by malicious software, likely to launch attacks, and/or likely to become infected by malicious software.

Furthermore, in some types of networks, for example, in mobile ad-hoc networks (MANETS) which can have, for example, no central control, no wireless switches, no base stations, and can have devices entering and leaving the network dynamically, decisions of whether to trust communications can be especially challenging due to the quickly changing topology and membership of the network. For example, an intrusion detection system can perceive packet dropping or communication from unknown outside digital processing devices as an indication of attack. However, such occurrences can be commonplace and benign in MANETS.

SUMMARY

Methods, media, and systems for securing communications between a first node and a second node are provided. In some embodiments, methods for securing communications between a first node and a second node are provided. The methods comprising: receiving at least one model of behavior of the second node at the first node; and authorizing the first node to receive traffic from the second node based on the difference between the at least one model of behavior of the second node and at least one model of behavior of the first node.

In some embodiments, a device that secures communication between a first node and a second node is provided. The device comprising: an interface in communication with a network; a memory; and a processor in communication with the memory and the interface; wherein the processor: receives at least one model of behavior of the second node; and authorizes the first node to receive traffic from the second node based on the difference between the at least one model of behavior of the second node and at least one model of behavior of the first node.

In some embodiments, a computer-readable medium containing computer-executable instructions, that when executed by a processor, cause the processor to perform methods for securing communications between a first node and a second node are provided. The methods comprising: receiving at least one model of behavior of the second node; and authorizing the first node to receive traffic from the second node based on the difference between the at least one model of behavior of the second node and at least one model of behavior of the first node.

In some embodiments, methods for securing communications between a first node and a second node are provided. The methods comprising: receiving at least one model of behavior of the second node at the first node; and rejecting traffic sent from the second node to the first node based on the difference between the at least one model of behavior of the second node and at least one model of behavior of the first node.

BRIEF DESCRIPTION OF THE DRAWINGS

FIG. 7 is an illustrative example of a table used to store information in accordance with some embodiments of the disclosed subject matter.

DETAILED DESCRIPTION

Figure 1:
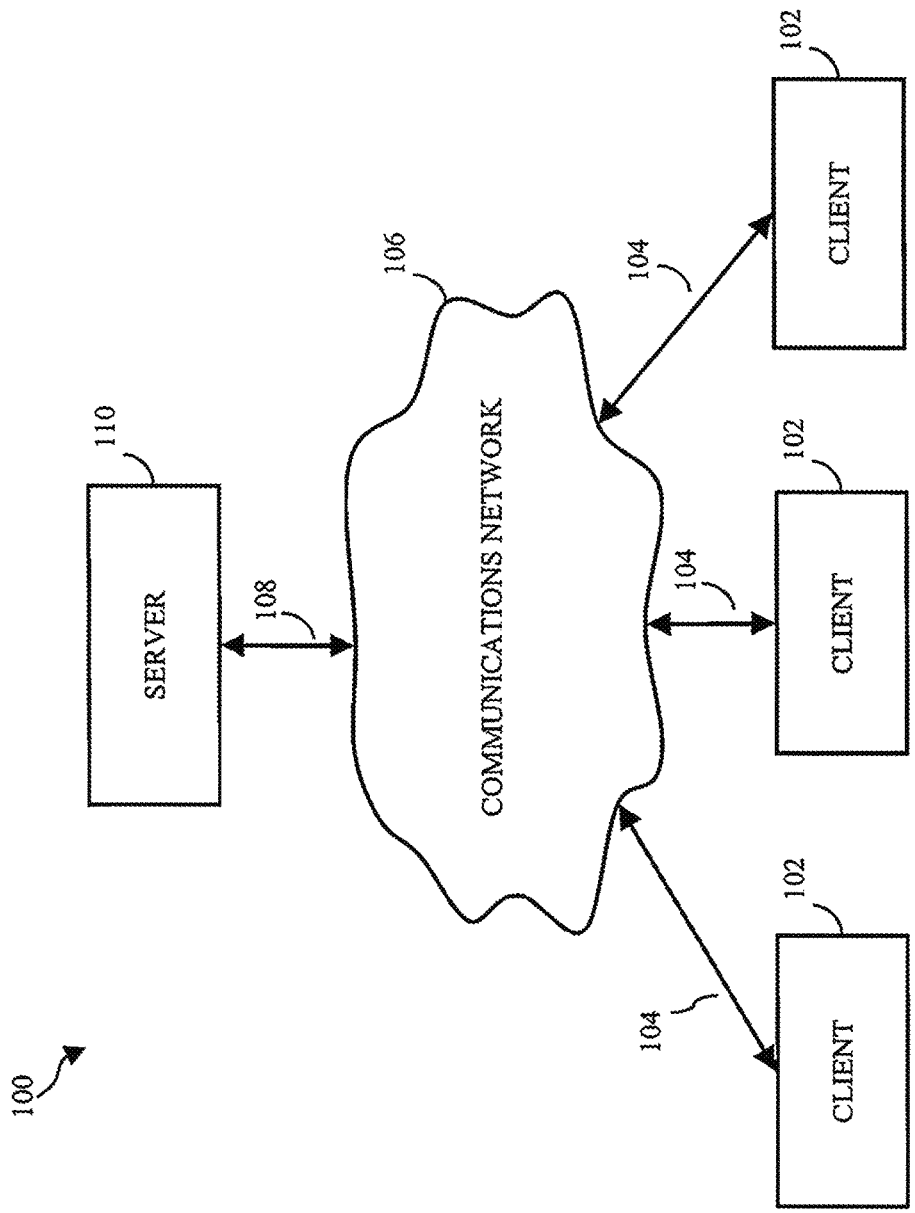
FIG. 1 is a schematic diagram of an illustrative system suitable for implementation of an application that secures communication between digital processing devices in accordance with some embodiments of the disclosed subject matter.

Methods, media, and systems for securing communications between a first node and a second node are disclosed. Some embodiments of the disclosed subject matter can authorize and/or authenticate, for example, a node so that it can be granted or denied entry and/or access to, for example, a network, another node, and/or a service. In some embodiments of the disclosed subject matter, a decision of whether to grant or deny access can be based on models of behavior. Some embodiments of the disclosed subject matter can compare, for example, a model to another model or a model to observed behavior and calculate a distance or difference value between the two models or the model and the behavior. Some embodiments can compute a threshold value, based on, for example, models or behaviors of nodes already in a network. Such a threshold can be used, in some embodiments, to grant or deny access to, for example, a node, network, or service based on a comparison of the threshold and a distance between, for example, models and/or observed behavior. In some embodiments, for example, if a model of a node requesting entry to a network is determined to be too different from the behavior of other nodes in the network, the node can be denied entry. Additionally, in some embodiments, for example, after being granted access to a network, a node can be blocked or otherwise removed from a network if, for example, its behavior model and its actual behavior are not within a certain distance. The disclosed subject matter can be used, in some embodiments, for example, to either augment or replace existing techniques of authenticating and authorizing nodes in a network.

Some embodiments of the disclosed subject matter can use any appropriate model type. For example, some embodiments can use a content anomaly detector that can calculate a model, for one or more ports, packet length, and direction of traffic flow (i.e., ingress and egress). This model can represent normal traffic for a set of features. The set (e.g., {port, packet length, direction}) can be modeled as one or more centroids that define the payload profile of normal traffic. Accordingly, such an anomaly detector can may be referred to as a payload anomaly detector. Each centroid can represent, for example, a 1-gram frequency analysis of the payload content and centroids can be clustered to reduce the size of the model. A model training phase, in such an anomaly detector, can be, for example, either online or offline. During the training phase, 1-gram frequency analysis can be computed for received packets. Training can generate normal input and output models and these models can be used during a testing phase to detect whether a payload going through a node follows a provided model or is too different from the normal profile and/or or model. In order to measure that difference, thresholds can be defined. After a training phase and before a testing phase, a calibration phase can be carried out over the same training data in order to obtain thresholds. When the traffic going through the testing phase has a payload whose distance to the normal model is greater than the calculated threshold, an alarm can be generated. More information on some examples of such anomaly detectors can be found in U.S. patent application Ser. No. 10/986,447 filed on Nov. 22, 2004, which is hereby incorporated by reference herein in its entirety.

Some embodiments of the disclosed subject matter can use, for example, content anomaly detectors that can build behavior profiles or models as Bloom filters. For example, a mixture of n-grams from the content of packets can be hashed into a Bloom filter to define the normal model from clean traffic seen by a node. Some embodiments of such detectors can also provide, for example, a second Bloom filter that can contain malicious n-grams, extracted from a set of online Snort rules associated with specific worms. Packets can be tested during detection by, for example, counting the number of malicious n-grams that were not seen during a training phase. N-grams appearing in a packet and in a malicious Bloom filter can be scored higher than other packets. Threshold logic can determine, for example, which packets to consider anomalous. More information on some examples of such detectors can be found in U.S. Provisional Patent Application No. 60/778,008, filed on Feb. 28, 2006, and Ke Wang, Janak J. Parekh, Salvatore J. Stolfo, "Anagram: A Content Anomaly Detector Resistant To Mimicry Attack" *In Proceedings of the Nineth International Symposium on Recent Advances in Intrusion Detection (RAID* 2006), Hamburg, Germany, September 2006, each of which is hereby incorporated by reference herein in its entirety.

FIG. 1 is a schematic diagram of an illustrative system 100 that may be used for model creation, model exchange, intrusion and anomaly detection, securing communications between digital processing devices, and/or for protecting applications from attack in accordance with some embodiments of the disclosed subject matter. As illustrated, system 100 can include one or more clients 102. Clients 102 can be local to each other or remote from each other, and can be connected by one or more communications links 104 to a communications network 106. Communications network 106 can also be linked through a communications link 108 to a server 110. Various embodiments of the disclosed subject matter can be implemented on at least one of the server and the clients. It is also possible that a client and a server can be connected through communication links 108 or 104 directly and not through a communication network 106.

In system 100, server 110 can be any suitable server or digital processing device for executing an application, such as, for example, a processor, a computer, a data processing device, or a combination of such devices. Communications network 106 can be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), a mobile ad-hoc network (MANET), or any combination of any of the same. Communications links 104 and 108 can be any communications links suitable for communicating data between clients 102 and server 110, such as network links, dial-up links, wireless links, hard-wired links, etc. Clients 102 can be any suitable digital processing devices, such as, for example, personal computers, laptop computers, mainframe computers, data displays, Internet browsers, personal digital assistants (PDAs), two-way pagers, wireless terminals, portable telephones, etc., or any combination of the same. Clients 102 and server 110 can be located at any suitable location. In one embodiment, clients 102 and server 110 can be located within an organization. Alternatively, clients 102 and server 110 can be distributed between multiple organizations.

Figure 2:
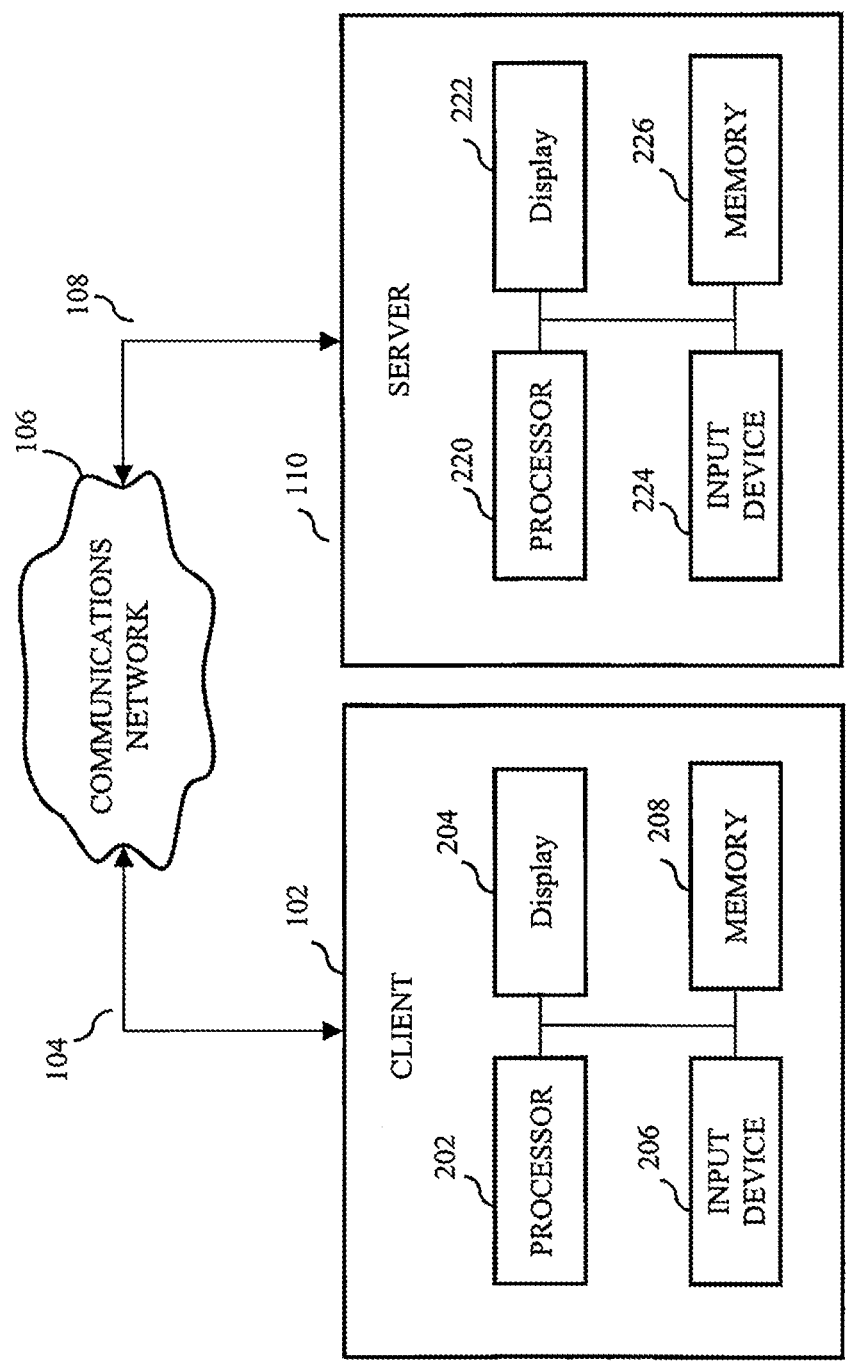
FIG. 2 is an example of the server and one of the clients of FIG. 1 that can be used in accordance with some embodiments of the disclosed subject matter.

The server and one of the clients, which are depicted in FIG. 1, are illustrated in more detail in FIG. 2. Referring to FIG. 2, client 102 and server 110 can include respectively, among other things, processors 202 and 220, displays 204 and 222, input devices 206 and 224, and memory 208 and 226, which can be interconnected. In one embodiment, memory 208 and 226 contain a storage device for storing a program for controlling processors 202 and 220. Memory 208 and 226 can also contain applications for model creation, model exchange, intrusion and anomaly detection, and for protecting applications from attack. In some embodiments, various applications can be resident in the memory of client 102 or server 110. It should be noted that variations and combinations of system 100 might be suitable for different embodiments of the disclosed subject matter. In addition, although some embodiments are described herein as being implemented on a client and/or a server, this is only illustrative. Various components of some embodiments of the disclosed subject matter can be implemented on any suitable platform.

It should be noted that system 100 can be, for example, a mobile ad-hoc network (MANET). Such a system can be self-configuring, where nodes, such as, for example, routers, clients, and/or servers can be connected by wireless links and form arbitrary topologies. Various components of the system 100 can be free to move randomly and organize arbitrarily. Accordingly, in some embodiments of the disclosed subject matter, the topology and membership of system 100 can change rapidly and unpredictably. A system 100 that is embodied as, for example, a MANET, can be connected to or in communication with other systems 100 that can be, for example, MANETs or any other type of appropriate network. Additionally, a system 100 can be a combination of various network types, for example, a system 100 can include some mobile nodes that can move in and out of the network and other nodes that can be stationary.

Some embodiments of the disclosed subject matter can be separated into two phases, such as, for example, an authorization phase and a communication phase. During an authorization phase, a node can request access to communicate with another node and can be either granted or denied that access. Each node can contain, for example, an anomaly detector that can build a model of, for example, its input and output traffic to define its normal behavior. Such models can be exchanged and compared among nodes and it can be determined how similar the models are to each other, by using, for example, threshold logic. The results of the comparison can be used to grant or deny access to a node.

During a communication phase, each node can compare, for example, actual behavior to various behavior models to validate that other nodes are acting according to their respective behavior models. This can detect, for example, if a node misrepresented its normal behavior during authorization or if its behavior changes thereafter. It should be noted, however, that some embodiments of the disclosed subject matter can be separated into more than two phases while other embodiments of the disclosed subject matter are not separated into phases at all. For example, in some embodiments, an authorization phase can be integrated with a communication phase.

When a node approaches the communication range of a network, authorization can begin. Authorization can result in a node being either accepted into, or rejected from, a network. A node already in the network, which is receiving a request to grant entry, can be referred to as a receiver and a new incoming node can be referred to as a solicitor. A node can request access to a network because, for example, it is a node with wireless connectivity that has reached the range of a wireless network such as a MANET. A node can also request access simply because it now needs or wants access to a network with which it was already able to send requests.

Figure 3:
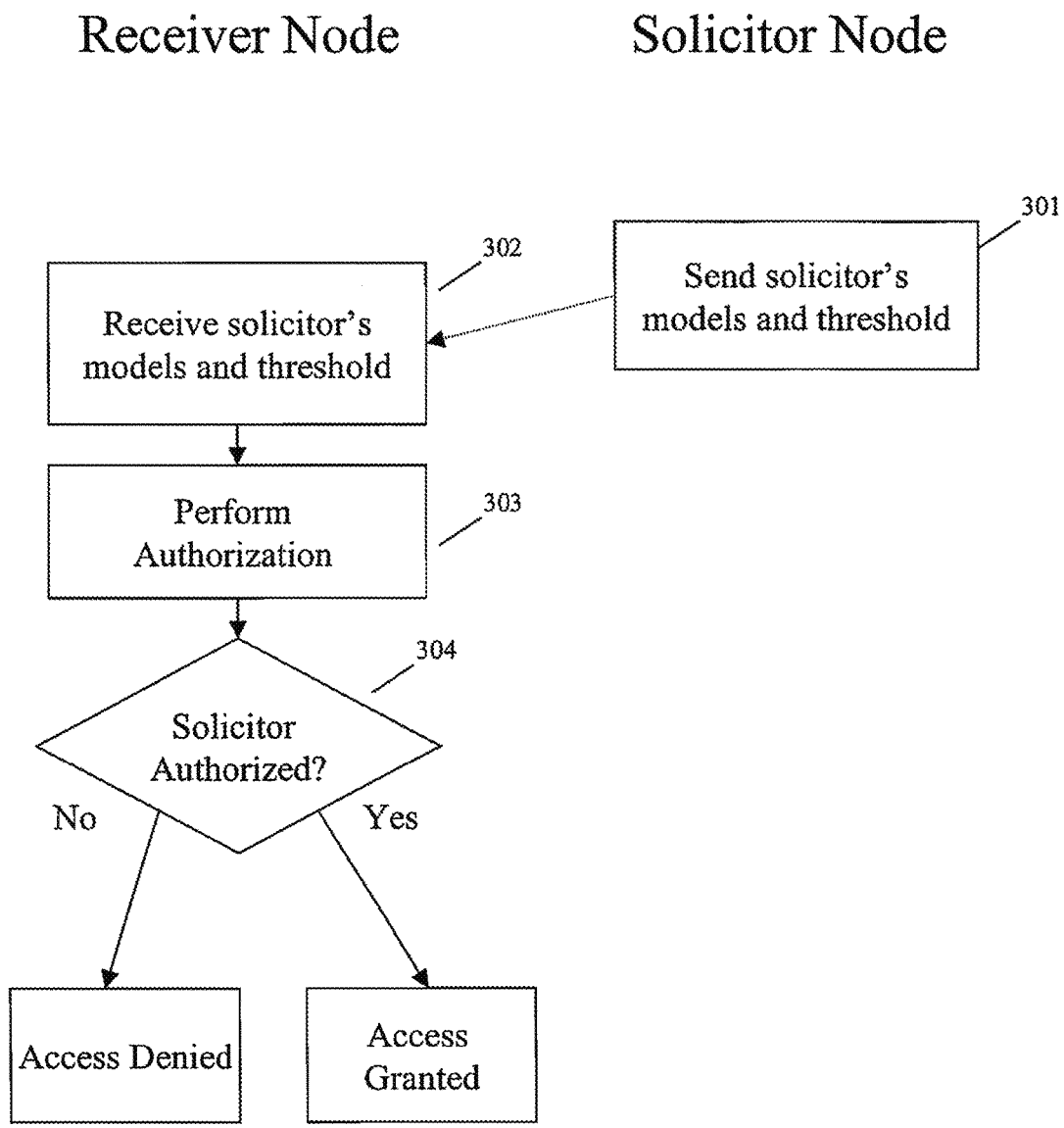
FIG. 3 is a simplified illustration of a method for securing communications between digital processing devices in accordance with some embodiments of the disclosed subject matter.

FIG. 3 illustrates authorization being performed between a receiver node and a solicitor node. A solicitor can send, at 301, its models and a traffic threshold to a receiver. The receiver can receive these, at 302, and perform various tests to determine if the solicitor should be granted access to, for example, the network of the receiver, at 303. These tests can include, for example, calculations of the differences between the models of the receiver and the models of the solicitor. A threshold value, for example, can be used to determine if these differences are too large for the solicitor to be admitted to the network. If the receiver node determines, at 304, that the models of the solicitor node are sufficiently similar to, for example, the models of the receiver, the solicitor can be admitted to the network. The roles of the node that was the solicitor and the node that was the receiver can be switched. That is the former solicitor node can also receive the models and a traffic threshold from the former receiver node and attempt to authorize the former receiver node to access the former solicitor node's network. These two authorizations can take place in parallel, in sequence, or partly overlapping in time. In some embodiments, once a node has been granted access to communicate with another node, it can be authorized to send traffic to that node despite it not yet allowing traffic to be received from that node. In some embodiments, until both a receiver node and a solicitor node have exchanged and authorized each other's models, traffic cannot be sent between them in either direction. In some embodiments, it is possible that only one of the nodes is required to go through an authorization process. In such embodiments, once a receiver authorizes a solicitor, both nodes can accept traffic from, and send traffic to, the other.

Figure 4:
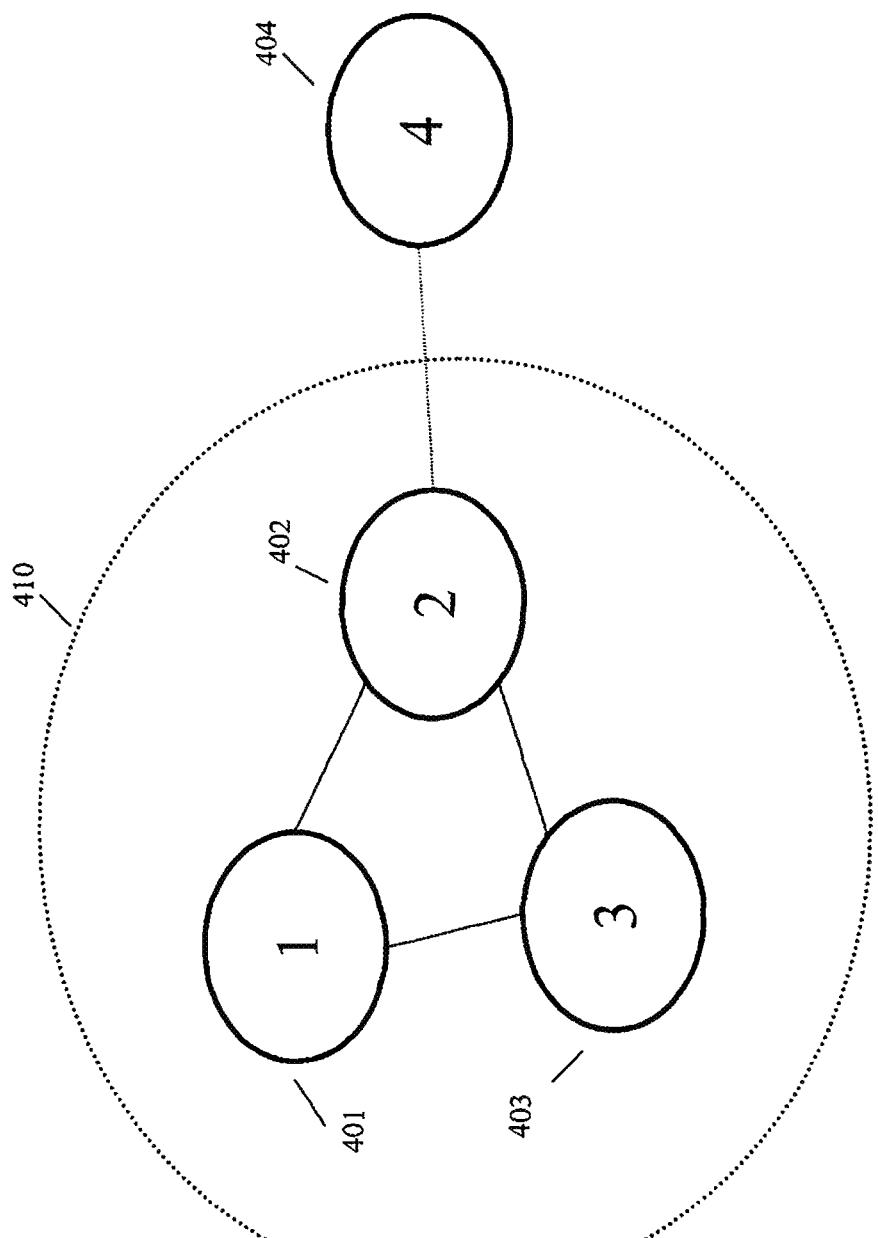
FIG. 4 is an illustrative example of an arrangement of a network in accordance with some embodiments of the disclosed subject matter.

As illustrated in FIG. 4, node 404 is in range of network 410, which contains nodes 401, 402, and 403. In this example, node 402 is in the communication range of node 404 and has received a request for access from node 404. Accordingly, node 402 can be referred to as the receiver, and node 404 can be referred to as the solicitor. An authorization phase can take place between node 402 and node 404 that can enable nodes 402 and 404 to communicate.

Figure 5:
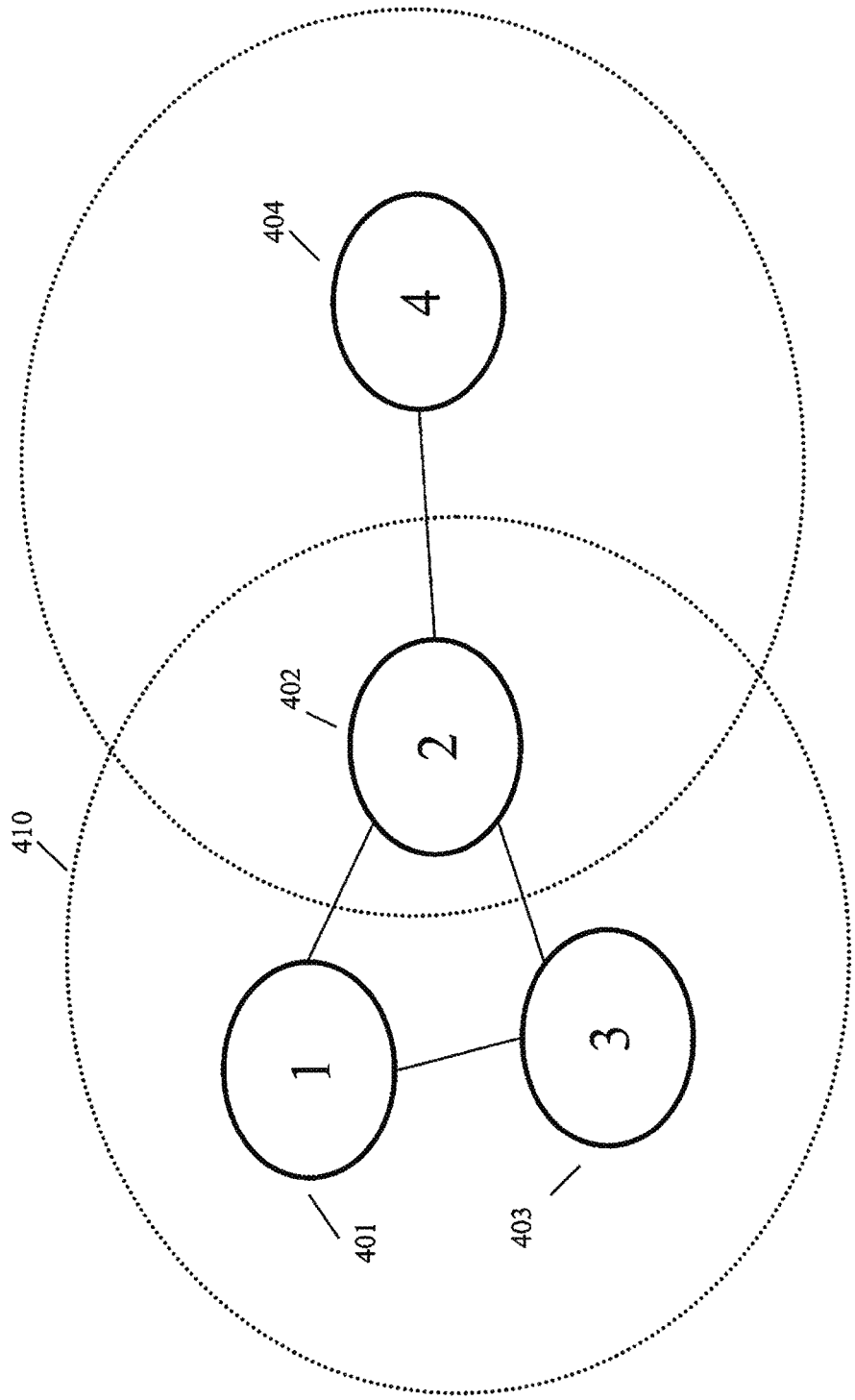
FIG. 5 is another illustrative example of an arrangement of a network in accordance with some embodiments of the disclosed subject matter.
Figure 6:
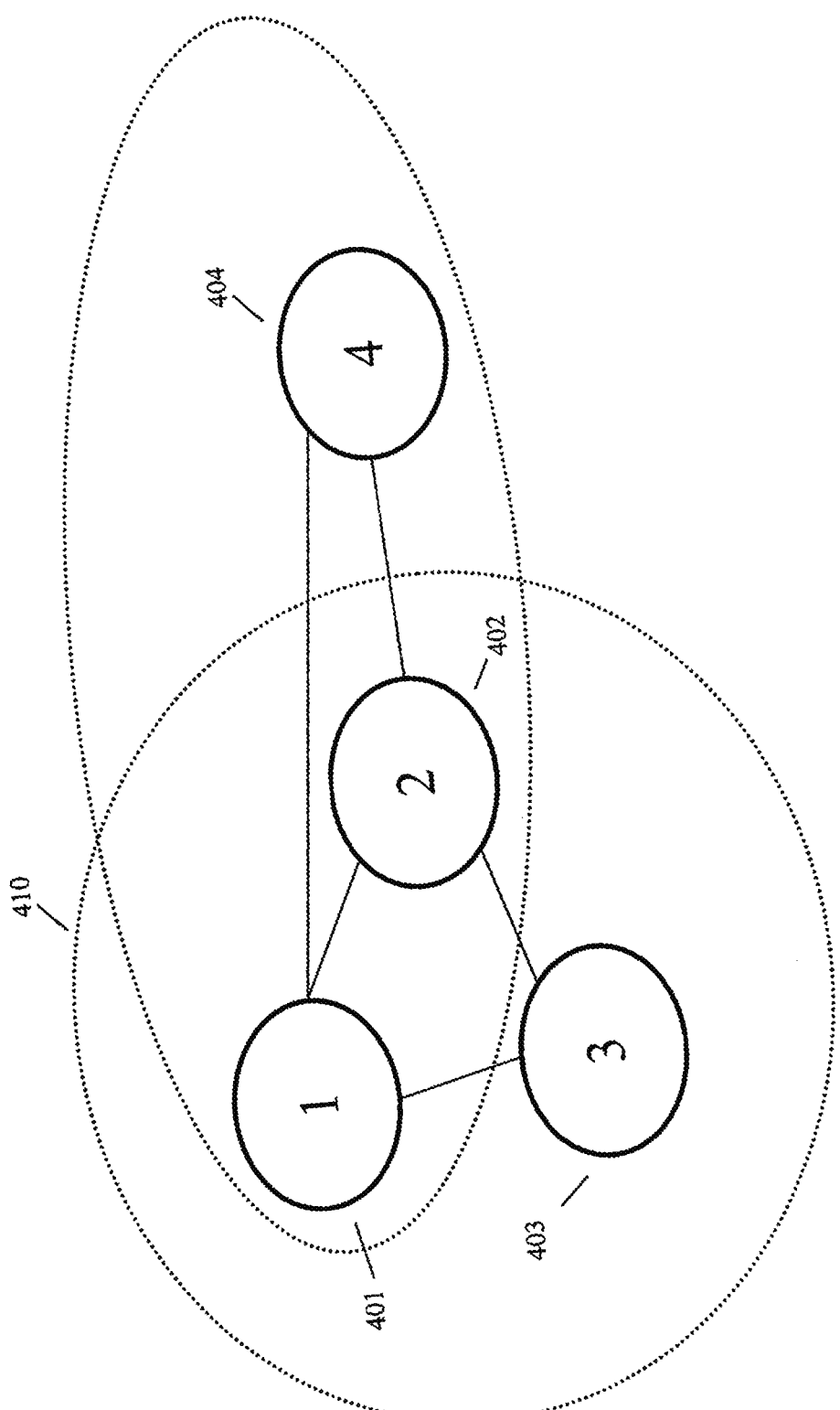
FIG. 6 is another illustrative example of an arrangement of a network in accordance with some embodiments of the disclosed subject matter.

In some embodiments, if a receiver authorizes a solicitor, the solicitor is only authorized to send traffic to that specific receiver. If the solicitor wishes to communicate with additional nodes in the network of the receiver, the solicitor can perform authorization with those nodes as well. Such embodiments can guarantee that each node has considered the models of each node it communicates with. For example, in some embodiments, as illustrated in FIG. 5, if node 404 is authorized by node 402, node 404 is authorized to communicate only with node 402. In such embodiments, if node 404 also needs to communicate, for example, with node 401, then nodes 401 and 404 can go through authorization. The configuration created by node 404 being authorized by both nodes 402 and 401, in such an embodiment, is illustrated in FIG. 6. In some embodiments, however, performing authorization with one node of a network can be sufficient to be granted access to all nodes in that network.

If a solicitor, such as node 404 is accepted into the network, its input, output, and worm models, as well as its threshold information can be saved in a receiver's model table together with the distances to the corresponding models. For example, FIG. 7 illustrates a model table of node 402. The models and the thresholds can be saved together with the distances between them and the input, output, and model of attack behavior. For example, such a table can contain information for each of the nodes 701 that a node has authorized. The information can include, for example, the input models 702, output models 703, and anomaly models (e.g., worm models) 704 for each of the nodes.

When, for example, referring again to FIG. 4, node 404 wants to communicate with network 410 it can provide information to node 402 to begin authorization. This information can include, for example, a certificate identifying node 404, node 404's input and output models, a traffic threshold of node 404's output model, and a model containing known attacks, such as a worm model. Node 404's input and output models can define, for example, the type of input and output traffic that node 404 usually sees and generates. Node 404's traffic threshold can define, for example, the logic and/or numerical threshold that it uses to decide whether traffic is anomalous. Such thresholds can be stored in column 705 of the table of FIG. 7. It should also be noted that node 404's model of known attacks can be, for example, a model of malicious n-grams, can be stored in a signature database, and can specify a set of worms and/or other malicious attackers known by node 404.

Node 402 can receive the information, sent from node 404, and use it to decide whether to grant access to node 404. In making a decision, node 402 can analyze the information in various ways. For example, node 402 can perform a serious of tests on this information and if each of the tests passes, node 404 can be admitted to network 410. A first test can be, for example, a test of the distance between node 402's model of known attacks and node 404's model of known attacks. This can be accomplished by, for example, calculating the distance between these models and if this distance is less than a certain threshold, granting access to node 404 or continuing on to another test. However, if the distance is, for example, greater than a certain threshold, node 404 can be denied access to the network 410 because, for example, its model of known attacks is not up to date. One reason for rejecting a solicitor on this basis is that, because the solicitor's state of protection can require updating, the solicitor can already be infected and thus could become a source of entry for worms or other attackers.

A second test, for example, can be a test of the distance between node 402's model of known attacks and the input and output models of node 404. This can, for example, be used to determine whether node 404's models contain malicious n-grams known by node 402. Like the first test, if this test passes, node 404 can be admitted to the network or another test can be performed. If the test fails, node 404 can be denied access to the network. One reason for rejecting a solicitor on this basis is that the presence of malicious traffic in a solicitor's output model can indicate that the receiver has sent malicious traffic and can, therefore, be likely to continuing sending malicious traffic if admitted to a network.

A third test, for example, can be a test of the distance between node 404's input model and node 402's input model and a test of the distance between node 402's output model and node 404's output model. These distances can be calculated to determine the similarity between node 402's behavior and node 404's behavior. If these distances are below a certain threshold, the models can be considered similar to normal models accepted by, for example, the network 410, and node 404 can therefore be granted access. If the distances are too great, however, node 404 can be denied access to, for example, the network.

The type of distance calculations performed, for example, in the above discussed tests, can depend on the type of models being used. If, for example, a payload based model is used, the distance can be, for example, a Manhattan distance to calculate how different the two models are in statistical distribution. If, for example, anomalous n-gram and/or Bloom filter based detectors are used, a count of the number of n-grams that the two models have in common can be used. It should be noted, however, that any appropriate type of model, combination of types of models, and/or distance calculations can be used.

In some embodiments of the disclosed subject matter, once nodes have completed authorization, the nodes can communicate with each other. This communication can take place, for example, by a sender sending traffic (e.g., packets) and a receiver receiving that traffic. It is possible, for example, that a malicious sender harboring a worm unknown to the receiver, has falsified one or more of its models and used those models to be authorized by the receiver. It is also possible that, for example, a sender was authorized with the proper models, but that the sender changes its behavior and now may attack the receiver with malicious traffic. For at least these reasons, some embodiments of the disclosed subject matter require tests during communication to continue to protect the security of a node.

The receiver can check incoming traffic for malicious content using the models that were exchanged during authorization. For example, referring again to FIG. 5, node 404 entered the network through an authorization phase communicating with node 402. Hence, node 402 can have the output model of node 404 saved in its model table (FIG. 7). When node 404 sends traffic to node 402, node 402 can check for the presence of anomalies in the traffic. For example, node 402 can check if the distance between the input from node 404 and its own input model is smaller than its own traffic threshold. This check can determine whether the input traffic is anomalous compared to the normal input traffic that node 402 uses as its ingress model. Another test can be made of the distance between the input traffic from node 404 and the output model of node 404 to see if it is below the sender's output traffic threshold. This test, can determine whether node 404 lied about its output model or its model of attack behavior when it entered the network. It is also possible, for example, that node 404 lied about its own output traffic threshold so that, given a value high enough, all traffic would be accepted as normal when compared to the output model of node 404. To avoid this, node 402 can redefine the traffic threshold of node 404 as the minimum of its own output threshold and the output threshold of node 404. In some embodiments, additional tests can be used in combination with, or in addition to, the example tests discussed above. In some embodiments, the test can be performed in various orders and that, upon failure of one tests, it may not be necessary to perform further tests. Some embodiments, however, can continue to perform test after a failing test and grant or deny entry based on, for example, the percentage of tests passed by a solicitor.

Similar to the distance functions used during authorization, the distance functions selected to compare models and traffic during communication, in some embodiments, can vary depending upon, for example, the model type, the traffic sensor being used to examine the traffic, and/or the type of traffic. For example, if the sensor is payload based, the distance can be represented, for example, with the Mahalanobis distance that checks how different are the input traffic packets from the definition of normal content learned by each node. If the sensor is n-gram and/or Bloom filter based, for example, the distance can be measured as the normalized number of unknown n-grams seen at each packet. However, any appropriate model, traffic sensor, and/or distance function can be used.

Some embodiments of the disclosed subject matter calculate and utilize thresholds to determine if a distance between, for example, models or behaviors is too great. Thresholds related to the models can be used, for example, during authorization and thresholds related to traffic can be used, for example, during communication. However, in some embodiments, various thresholds, including model thresholds and traffic thresholds, can be used during both authorization and communication.

As discussed, in some embodiments, model thresholds can be used during authorization to determine whether various distances between models and/or behaviors are within certain model thresholds. These tests can consider, for example, whether the distance between two models is less than or equal to the threshold. The threshold can be calculated as the maximum distance between a model of the receiver and each of the corresponding models in the other nodes of the network. For example, referring to FIG. 4, when authorizing node 404, node 402 can calculate the distances between its input model and the input models of nodes 401 and 403. Node 402 can then use the larger of those two distances as the threshold when comparing its model to the input model of node 404. In some embodiments, a node does not have to calculate theses distances each time it needs a threshold value because the distances can have been calculated during authorizing and been stored in a node's model table (e.g., column 706 of FIG. 7).

In some embodiments, models in each of the node's model table can be changed, deleted, updated, or refreshed. These changes can occur at various intervals or be instigated by, for example, the network. Some embodiments, for example, can, after the passing of a fixed or configurable amount of time, require all nodes to reauthorize their access to a network. When models are renewed, the model threshold can be, for example, zeroed and recalculated to adapt the new values. Furthermore, during reauthorization, some nodes can be expelled from the network In some embodiments, the order in which nodes enter a network can have an effect on the threshold. For example, if the first node to enter has a large distance from the only other node in the network, the threshold can be correspondingly large. Accordingly, some embodiments can include, for example, additional restrictions or considerations in threshold calculation. For example, some embodiments can include a default threshold to be used if, for example, only one node is in network. Additionally, some embodiments can, for example, select the smallest distance between member nodes as a threshold or average the distance among various member nodes to calculate a threshold.

A traffic threshold can be calculated during the training of a model and can be used, in some embodiments, in the communication phase. A receiver can compare the distance between the incoming traffic and its own input model against an input threshold of the receiver ($Th\_in\_r$). Additionally, a receiver can compare this distance between the incoming traffic and the sender's output model against an output threshold of the sender ($Th\_in\_s$). The two thresholds, $Th\_in\_r$ and $Th\_in\_s$, can be calculated, for example, during the training of the model built by an anomaly detection sensor installed in each node. A node can use its own threshold to compare the input traffic against its own input model. When comparing the input traffic against the sender's output model, the threshold used can be the minimum between its own output traffic threshold and the sender's output traffic threshold. The choice of the minimum between the two thresholds can decrease what is considered an acceptable difference between models, when detecting anomalous content, and can enhance performance in situations where a sender may have sent a correct model but lied about its traffic threshold.

In some embodiments of the disclosed subject matter, a node may not compute its own model. This can be, for example, because the node lacks sufficient computational ability, memory, batter power, traffic, or simply for reasons of design choice. In such embodiments, models can be computed by, for example, a server or another node.

In some embodiments, a server can generate models for a node. In such embodiments, model training can be performed on a server and the model can be distributed to a node. If, for example, a node has wide-area network (WAN) connectivity, the node can request and download a model, such as the most recent model, from the server. Alternatively, the server could push the model to the node on, for example, a periodic basis. Other embodiments can use a hierarchical distribution where, for example, a single node can download the model over a WAN link and can use a wireless-local-area network (WLAN) link to distribute the updated model to other nodes. This may be useful, for example, if use of the WAN link is expensive. In other embodiments, for example, if no connectivity is available, nodes can be initialized with a model before deployment and synchronized when connectivity is available. This can be useful, for example, for handheld devices, such as personal digital assistants (PDAs), which often have bases stations where synchronization can be performed. However, it should be noted that, in some embodiments, handheld devices can compute their own models.

In some embodiments, where, for example, a server is not available, a node can be selected as a model-generating node to listen to traffic on the network, generate models, and distribute them to other nodes. The model-generating node can be selected based on any appropriate criteria, for example, processing power, battery power, and/or network connectivity. Alternatively, a node from a first network, which is able to compute a model, can provide models to nodes in a second network that cannot or choose not to generate their own models. In some embodiments, nodes can compute some of their own models, for example, input and output models, and have a model of attack behavior (e.g., a worm model) calculated for them by another source using, for example, one or more of the above described systems and methods.

As discussed above, each node in a network 410 can have a model table (e.g., FIG. 7) that can contain, for example, input models, output models, known attack models, traffic thresholds, and distances between the various models. A node can also have a copy of, for example, its own input and output models. Also, as discussed above, in some embodiments, it can be of benefit to update the models as time passes and/or as nodes seem more traffic. Updates to the models can be performed using any appropriate system and method. Some embodiments, for example, can replace an old model with a newly received or generated model. Other embodiments can process the new model in relation to the node's old model, for example, a node can aggregate or merge an old model with a new model.

Some embodiments, for example, can redefine a node's input and output models as a merge between an old model and a new model of a node whose model has been accepted as having a similar set of known worms and a similar profile during an authorization. Other embodiments can train a model in epochs. This is accomplished by shifting the model update decision to a sensor. At each epoch, a sensor can decide whether a model is good enough or if it should continue to train the model. This can result in an automated update process. It should also be noted that, for example, worm models can be updated periodically with new worm models when, for example, new worms are detected.

Some embodiments can aggregate models to produce a model that represents a unified view of the current network. Such aggregation can, for example, reduce false suspicions of anomalous behavior and can enable the incremental, decentralized evolution of the network as the nature of the tasks running and the distribution of the nodes changes.

Some embodiments of the disclosed subject matter can decide how to update a model, for example, based on the similarity of a new model and an old model. For example, if a number of nodes exhibit similar behavior and/or performing similar tasks, it can be of benefit to aggregate those nodes' models to produce a unified view of the network.

This can be useful, for example, in reducing false positive detections of suspicious behavior due to small differences in the models.

Some embodiments of the disclosed subject matter can be implemented, tested, and/or demonstrated in a local area network environment. Such an environment can contain various machines offering various services. Traffic information can be gathered, for example, for http services from port 80. This traffic can be clean traffic with no worms. A set of packets gathered can be partitioned into logical disjoint sets, for example, four sets named A, B, C and D. Furthermore, part of this data (e.g., 80%) can be used to train models and another part (e.g., 20%) can be used as test data. Each set can correspond to a logical node of, for example, a simulated MANET. Hence, data can be randomly drawn to generate training for each ingress and egress model of each node (i.e., set). Training data for an ingress model of one of the four nodes can be randomly drawn from the packets in data corresponding to the three other nodes. For example, the ingress model for node A can be drawn from the packets of nodes B, C, and D. Any appropriate amount of training data can be used. For example, some embodiments can use approximately 40K packets to train each node. Training data for each egress model can be randomly drawn from its own set of packets. For example, the egress model of node A can be trained using the packets in set A.

An n-gram and/or Bloom filter based sensor can be used to produce A set of input and output models, such as, for example, m_in_A, m_out_B, m_out_C, m_out_D, where m_in_i stands for i's input model and m_out_i stands for i's output model. For purposes of explanation, it can be assumed that A is the receiver node in a MANET, and that B, C, and D will try to enter the MANET, and if successful, communicate with A.

Some embodiments can calculate thresholds for the distances between worm models and normal models (i.e., Dist(mw_i, m_j) and Dist(m_i, m_j)). It may be of benefit to find thresholds that differentiate normal models from worm models and that divide normal models from suspicious models (e.g., models built for nodes that have seen a small amount of malicious traffic). A model can have a corresponding threshold value used to decide whether a test value (e.g. input traffic and/or output traffic) is considered close to that model. Because, in some embodiments, a node can test incoming traffic from a sending node, which was previously granted access, two models can be tested. A receiving node can have its own model of input that it considers to be normal. This model can have a threshold, Th_a_i(2). A sending node can send its own egress model to a receiving node. A receiving node can test an egress model to determine whether the sending node is sending traffic considered to be too different from the behavior described in the egress model. A threshold, Th_a_i(3), can be used for this purpose. Models with distances to the receiver's worms model greater than a threshold Th_a_i(2) or with distances to the receiver's normal model greater than an estimated threshold, Th_a_i(3) can be rejected.

Some embodiments can compute normal and worm models for each of the nodes using, for example, detectors based on Bloom filters as described above. Any appropriate Bloom filter size can be chosen. For example, a Bloom filter size of $2^{20}$ bits, which can be an appropriate size in, for example, some MANETS, to be exchanged among nodes.

As discussed, a distance threshold can be calculated to separate normal models from models that contain worms. Various output models can be obtained from a network to accomplish this. A size of n-gram (e.g., a 5-gram) can also be selected as the building size for the models. The distance between A's input model and B, C, and D's output models can be calculated. The distance can be defined as a squared Euclidean distance of $th1$=distance($A,Y$)=cardinality($A$ AND $Y$)/cardinality ($A$), and its asymmetric, $th2$=distance($Y,A$)=cardinality($Y$ AND $A$)/cardinality ($Y$), where "AND" is logical AND, $A$ is $A$'s normal model, and $Y$ is the set of $B$'s, $C$'s, and $D$'s normal models.

During a testing phase, the models used to obtain thresholds can be infected with known worms. Worms can be chosen to attack the port 80 http service. Any appropriate worms can be selected, for example, iiswebdav, iismedia, crii, and php. Using the distance threshold, th1, obtained during training, many of the worms that populate the models can be captured. Some worms, which may not be detected during training, can be detected during communication. This can be because, in some embodiments, detection during the communication phase can be done at the packet level. This can be true, for example, of the php worm.

Threshold distances between a bad Bloom filter of A (e.g., a collection of known worms and viruses) and a set of normal output models of B, C and D can also be calculated. The threshold distances can define the maximum distance between normal models and the bad Bloom filter. A distance above the threshold can mean that the model is too close to the bad Bloom filter (i.e., it may indicate a worm or other abnormal behavior). Threshold distances are calculated as squared Euclidean distances, as describe above. However, in this case, A is A's bad Bloom filter During the testing phase, the normal models can be infected with known worms (e.g., iiswebdav, iismedia, crii, and php) and the distances between these models and A's bad Bloom filter can be calculated to see whether the distances are, for example, above the threshold th2 (i.e., the model is too close to the bad Bloom filter and it may be infected with a worm) or below the threshold th2 (i.e., the model is within the limits of normalcy learned during the training phase).

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. The disclosed subject matter can be used to prevent attacks in addition to the illustrative example attacks described above. It should be noted that features of the disclosed embodiments can be combined and rearranged in various ways.

What is claimed is:

1. A method for securing communications between a first node and a second node, comprising:
   receiving via a network interface at least one model of behavior of the second node at least one hardware processor of the first node, which the at least one model of behavior of the second node was generated by a node other than the first node and which at least one model of behavior of the second node represents a payload profile of normal traffic of the second node;
   determining, using the at least one hardware processor of the first node, how similar are the at least one model of behavior of the second node and at least one model of behavior of the first node, which at least one model of behavior of the first node represents a payload profile of normal traffic of the first node; and checking whether a distance between input traffic from the second node and one of at least one model of behavior of the first node is below a first threshold.

2. The method of claim 1, further comprising checking whether a distance between the input traffic from the second node and one of the at least one model of behavior of the second node is below a second threshold.

3. The method of claim 1, further comprising granting, using the at least one hardware processor of the first node, the second node access to a network of the first node based on how different are the at least one model of behavior of the second node and the at least one model of behavior of the first node.

4. The method of claim 1, further comprising determining a distance between the at least one model of behavior of the second node and the at least one model of behavior of the first node.

5. The method of claim 4, further comprising comparing the distance to a threshold.

6. The method of claim 5, further comprising calculating the threshold based on the distance between the at least one model of behavior of the first node and at least one model of behavior of at least one other node.

7. A device that secures communications between a first node and a second node, comprising:
   an interface in communication with a network;
   a memory; and
   a processor in communication with the memory and the interface; wherein the processor:
      receives via a network interface at least one model of behavior of the second node, which the at least one model of behavior of the second node was generated by a node other than the first node and which at least one model of behavior of the second node represents a payload profile of normal traffic of the second node;
      determines how similar are the at least one model of behavior of the second node and at least one model of behavior of the first node, which at least one model of behavior of the first node represents a payload profile of normal traffic of the first node; and
      checks whether a distance between input traffic from the second.

8. The device of claim 7, wherein the processor further checks whether a distance between the input traffic from the second node and one of the at least one model of behavior of the second node is below a second threshold.

9. The device of claim 8, wherein the processor further grants the second node access to a network of the first node based on how different are the at least one model of behavior of the second node and the at least one model of behavior of the first node.

10. The device of claim 8, wherein the processor further determines a distance between the at least one model of behavior of the second node and the at least one model of behavior of the first node.

11. The device of claim 10, wherein the processor further compares the distance to a threshold.

12. The device of claim 11, where the processor further calculates the threshold based on the distance between the at least one model of behavior of the first node and at least one model of behavior of at least one other node.

13. A non-transitory computer-readable medium containing computer executable instructions that, when executed by a processor of a first node, cause the processor to perform a method for securing communications between the first node and a second node, comprising:
   receiving, via a network interface at least one model of behavior of the second node, which the at least one mode of behavior of the second node was generated by a node other than the first node and which at least one model of behavior of the second node represents a payload profile of normal traffic of the second node;
   determining how similar are the at least one model of behavior of the second node and at least one model of behavior of the first node, which at least one model of behavior of the first node represents a payload profile of normal traffic of the first node; and checking whether a distance between input traffic from the second node and one of the at least one model of behavior of the first node is below a first threshold.

14. The non-transitory computer-readable medium of claim 13, the method further comprising checking whether a distance between the input traffic from the second node and one of the at least one model of behavior of the second node is below a second threshold.

15. The non-transitory computer-readable medium of claim 13, the method further comprising granting, using the at least one hardware processor of the first node, the second node access to a network of the first node based on how different are the at least one model of behavior of the second node and the at least one model of behavior of the first node.

16. The non-transitory computer-readable medium of claim 13, the method further comprising determining a distance between the at least one model of behavior of the second node and the at least one model of behavior of the first node.

17. The non-transitory computer-readable medium of claim 16, the method further comprising comparing the distance to a threshold.

18. The non-transitory computer-readable medium of claim 17, the method further comprising calculating the threshold based on the distance between the at least one model of behavior of the first node and at least one model of behavior of at least one other node.

* * * * *

UNITED STATES PATENT AND TRADEMARK OFFICE
CERTIFICATE OF CORRECTION

PATENT NO.        : 10,178,104 B2
APPLICATION NO.   : 15/587763
DATED             : July 31, 2018
INVENTOR(S)       : Salvatore J. Stolfo et al.

Page 1 of 1

It is certified that error appears in the above-identified patent and that said Letters Patent is hereby corrected as shown below:

In the Claims

Column 13, Line 4, Claim 1 "one of at least" should be --one of the at least--.

Signed and Sealed this
Twelfth Day of March, 2019

Andrei Iancu
*Director of the United States Patent and Trademark Office*